(12) United States Patent
Bai et al.

(10) Patent No.: US 12,512,465 B2
(45) Date of Patent: Dec. 30, 2025

(54) COMPOSITE NEGATIVE ELECTRODE ACTIVE MATERIAL AND PREPARATION METHOD THEREFOR, NEGATIVE ELECTRODE PLATE COMPRISING SAME, SECONDARY BATTERY, AND POWER CONSUMING DEVICE

(71) Applicant: Contemporary Amperex Technology (Hong Kong) Limited, Hong Kong (CN)

(72) Inventors: Wenlong Bai, Ningde (CN); Yiyang Wu, Ningde (CN); Baozhen Wu, Ningde (CN); Yonghuang Ye, Ningde (CN); Xingyan You, Ningde (CN); Yuwen Wang, Ningde (CN); Wei Zheng, Ningde (CN); Kai Wu, Ningde (CN)

(73) Assignee: Contemporary Amperex Technology (Hong Kong) Limited, Hong Kong (CN)

( * ) Notice: Subject to any disclaimer, the term of this patent is extended or adjusted under 35 U.S.C. 154(b) by 0 days.

(21) Appl. No.: 18/948,493

(22) Filed: Nov. 15, 2024

(65) Prior Publication Data
US 2025/0070143 A1   Feb. 27, 2025

Related U.S. Application Data

(63) Continuation of application No. PCT/CN2022/110568, filed on Aug. 5, 2022.

(51) Int. Cl.
*H01M 4/36* (2006.01)
*H01M 4/02* (2006.01)
(Continued)

(52) U.S. Cl.
CPC .......... *H01M 4/366* (2013.01); *H01M 4/386* (2013.01); *H01M 4/387* (2013.01); *H01M 4/483* (2013.01);
(Continued)

(58) Field of Classification Search
None
See application file for complete search history.

(56) References Cited

U.S. PATENT DOCUMENTS 3,708,458 A * 1/1973 Alberino ............ C08G 73/1042
528/229
2008/0124631 A1 * 5/2008 Fukui ...................... H01M 4/38
427/58

(Continued)

FOREIGN PATENT DOCUMENTS

| CN | 101210119 A | 7/2008 |
|----|-------------|--------|
| CN | 101471438 A | 7/2009 |

(Continued)

OTHER PUBLICATIONS

Herrmann et al., DE-102014207881 Machine Translation (Year: 2015).*

(Continued)

*Primary Examiner* — Ula C Ruddock
*Assistant Examiner* — Anna Korovina
(74) *Attorney, Agent, or Firm* — K&L Gates LLP

(57) ABSTRACT

The present application provides a composite negative electrode active material and a preparation method therefor, a negative electrode plate comprising same, a secondary battery and a power consuming device. The composite negative electrode active material comprises a negative electrode active material substrate and a conductive polymer layer on the surface of the negative electrode active material substrate, wherein the cyclic voltammetry curve of the com- (Continued)

posite negative electrode active material has an oxidation peak within a range of 3.2 V-3.6 V and a reduction peak within a range of 2.1 V-2.6 V. The composite negative electrode active material provided by the present application can combine a low volume expansion, a high capacity per gram and a high initial coulombic efficiency, thus enabling a secondary battery to combine a low volume expansion, a high energy density and a long cycle life.

22 Claims, 5 Drawing Sheets

(51) Int. Cl.
*H01M 4/38* (2006.01)
*H01M 4/48* (2010.01)
*H01M 4/58* (2010.01)
*H01M 4/587* (2010.01)
*H01M 4/62* (2006.01)

(52) U.S. Cl.
CPC ......... *H01M 4/5825* (2013.01); *H01M 4/587* (2013.01); *H01M 4/622* (2013.01); *H01M 4/624* (2013.01); *H01M 2004/021* (2013.01); *H01M 2004/027* (2013.01)

(56) References Cited

U.S. PATENT DOCUMENTS

| | | | |
|---|---|---|---|
| 2009/0087748 A1 | 4/2009 | Choi et al. | |
| 2009/0246632 A1* | 10/2009 | Fukui | H01M 4/621 |
| | | | 29/623.5 |
| 2013/0171520 A1* | 7/2013 | Nakayama | H01G 11/48 |
| | | | 429/211 |
| 2018/0083268 A1* | 3/2018 | Huang | H01M 4/587 |
| 2018/0254476 A1* | 9/2018 | Fujiwara | H01M 4/62 |

FOREIGN PATENT DOCUMENTS

| | | | | | |
|---|---|---|---|---|---|
| CN | 103456928 | A | | 12/2013 | |
| CN | 105098185 | A | | 11/2015 | |
| CN | 105762336 | A | | 7/2016 | |
| CN | 106207120 | A | | 12/2016 | |
| CN | 107195867 | A | | 9/2017 | |
| CN | 107251281 | A | | 10/2017 | |
| CN | 108461723 | A | * | 8/2018 | ........ H01M 10/0525 |
| CN | 109755582 | A | * | 5/2019 | |
| CN | 10832136 | B | | 7/2020 | |
| CN | 111584848 | A | | 8/2020 | |
| CN | 111769266 | A | | 10/2020 | |
| CN | 112018334 | A | | 12/2020 | |
| CN | 112310352 | A | | 2/2021 | |
| CN | 112310355 | A | | 2/2021 | |
| CN | 113611860 | A | | 11/2021 | |
| CN | 114057199 | A | | 2/2022 | |
| CN | 114497471 | A | | 5/2022 | |
| DE | 102014207881 | A1 | * | 10/2015 | ........... C01B 33/037 |
| JP | 2005158882 | A | | 6/2005 | |
| JP | 2021521622 | A | | 8/2021 | |
| WO | 2016136543 | A1 | | 9/2016 | |

OTHER PUBLICATIONS

Li et al., CN-108461723 Machine Translation (Year: 2018).*
Qiu et al., CN-109755582 Machine Translation (Year: 2019).*
International Search Report received in the counterpart international application PCT/CN2022/110568, mailed on Apr. 23, 2023.
Written Opinion of ISA received in the counterpart international application PCT/CN2022/110568, mailed on Apr. 23, 2023.
The Notice of Refusal received in the counterpart JP Application 2024-562202, mailed on Mar. 24, 2025, 6 pages.
The Notice of Registration received in the counterpart CN Application No. 202280012815.4, mailed on Nov. 10, 2025, 7 pages with English translation.

* cited by examiner

COMPOSITE NEGATIVE ELECTRODE ACTIVE MATERIAL AND PREPARATION METHOD THEREFOR, NEGATIVE ELECTRODE PLATE COMPRISING SAME, SECONDARY BATTERY, AND POWER CONSUMING DEVICE

CROSS-REFERENCE TO RELATED APPLICATIONS

This application is a continuation of International Application No. PCT/CN2022/110568, filed on Aug. 5, 2022, the content of which is incorporated herein by reference in its entirety.

TECHNICAL FIELD

The present application belongs to the technical field of batteries, and in particular relates to a composite negative electrode active material and a preparation method therefor, a negative electrode plate comprising same, a secondary battery, and a power consuming device.

BACKGROUND ART

In recent years, secondary batteries have been widely used in energy storage power systems such as hydroelectric, thermal, wind and solar power plants, as well as electric tools, electric bicycles, electric motorcycles, electric vehicles, military equipment, aerospace and other fields. During the charging and discharging of a secondary battery, lithium ions are intercalated into and de-intercalated from an electrode active material, which will cause the volume change of the electrode active material and then lead to the expansion and contraction of a battery; moreover, the battery expansion has become an important factor affecting the safety performance and electrochemical performance of secondary batteries. In particular, the volume expansion of a negative electrode active material will affect the cycle life and capacity characteristics of secondary batteries.

SUMMARY OF THE INVENTION

The object of the present application is to provide a composite negative electrode active material and a preparation method therefor, a negative electrode plate comprising same, a secondary battery and a power consuming device. The composite negative electrode active material can combine a low volume expansion, a high capacity per gram and a high initial coulombic efficiency, thus enabling a secondary battery to combine a low volume expansion, a high energy density and a long cycle life.

A first aspect of the present application provides a composite negative electrode active material comprising a negative electrode active material substrate and a conductive polymer layer on the surface of the negative electrode active material substrate, wherein the cyclic voltammetry curve of the composite negative electrode active material has an oxidation peak within a range of 3.2 V-3.6 V and a reduction peak within a range of 2.1 V-2.6 V.

The cyclic voltammetry curve of the composite negative electrode active material is obtained according to the following test method comprising: (1) providing a negative electrode plate comprising the composite negative electrode active material; (2) using a metal lithium plate as a counter electrode, an electrolyte solution with 1 mol/L of lithium hexafluorophosphate as a solute and a mixed solution of ethylene carbonate and dimethyl carbonate at a volume ratio of 1:1 as a solvent, and a glass fiber as a separator, and assembling same with the negative electrode plate to form a button cell in a glove box filled with argon, and leaving the packaged button cell to stand in the glove box for 12 hours or more for aging same; and (3) subjecting the resulting button cell to a cyclic voltammetry test by means of an electrochemical workstation to obtain the cyclic voltammetry curve of the composite negative electrode active material, wherein a scanning voltage is 2.0 V-4.3 V and a scanning rate is 0.1 mV/s.

After extensive studies, the inventors of the present application have found that by means of providing a conductive polymer layer on the surface of the negative electrode active material substrate and making the cyclic voltammetry curve of the composite negative electrode active material show an oxidation peak within a range of 3.2 V-3.6 V and a reduction peak within a range of 2.1 V-2.6 V, the resulting composite negative electrode active material can combine a low volume expansion, a high capacity per gram and a high initial coulombic efficiency.

Different from a traditional conductive carbon coating layer, the coating layer in the present application is a conductive polymer layer, such that the coating layer has a relatively small rigidity and a good flexibility, is less likely to crack during the charging and discharging of a secondary battery and thus can continuously protect the negative electrode active material substrate, thereby avoiding the direct contact between the negative electrode active material substrate and an electrolyte solution and avoiding the continuous consumption of active lithium ions and the continuous growth and thickening of an SEI film and a side reaction product layer. The conductive polymer layer of the present application comprises a conductive polymer. Different from a traditional conductive polymer (e.g., polyaniline, polypyrrole, polythiophene, etc.), the conductive polymer used in the conductive polymer layer of the present application can enable the composite negative electrode active material to have a higher oxidation peak potential and reduction peak potential, such that the conductive polymer layer of the present application also has a lithium storage function, which can, on the one hand, share the lithium storage current and reduce the damage of the current to the negative electrode active material substrate, and on the other side, can share the lithium intercalation pressure of the negative electrode active material substrate and increase the energy density of the secondary battery. In addition, the conductive polymer layer of the present application is also beneficial to reducing the concentration of lithium ions on the negative electrode side, thereby decreasing the concentration polarization. Therefore, when the composite negative electrode active material of the present application is applied to a secondary battery, such a secondary battery can combine a low volume expansion, a high energy density and a long cycle life.

In any embodiment of the present application, the cyclic voltammetry curve of the composite negative electrode active material has an oxidation peak within a range of 3.3 V-3.55 V. Thus, the composite negative electrode active material can have an appropriate delithiation function, which is beneficial to increasing the capacity per gram and the initial coulombic efficiency of the composite negative electrode active material, and then is conducive to improving the energy density of a secondary battery.

In any embodiment of the present application, the cyclic voltammetry curve of the composite negative electrode active material has a reduction peak within a range of 2.2

V-2.45 V. Thus, the composite negative electrode active material can have an appropriate lithium storage function, which is beneficial to increasing the capacity per gram and the initial coulombic efficiency of the composite negative electrode active material, and then is conducive to improving the energy density of a secondary battery.

In any embodiment of the present application, the potential of the oxidation peak on the cyclic voltammetry curve of the composite negative electrode active material is higher than the potential of the oxidation peak on the cyclic voltammetry curve of the negative electrode active material substrate, and optionally, the difference between the potential of the oxidation peak on the cyclic voltammetry curve of the composite negative electrode active material and the potential of the oxidation peak on the cyclic voltammetry curve of the negative electrode active material substrate is 2.4 V-2.8 V, more optionally 2.5 V-2.75 V. Thus, the composite negative electrode active material can have an appropriate delithiation function, which is beneficial to increasing the capacity per gram and the initial coulombic efficiency of the composite negative electrode active material, and then is conducive to improving the energy density of a secondary battery.

In any embodiment of the present application, the potential of the reduction peak on the cyclic voltammetry curve of the composite negative electrode active material is higher than the potential of the reduction peak on the cyclic voltammetry curve of the negative electrode active material substrate, and optionally, the difference between the potential of the reduction peak on the cyclic voltammetry curve of the composite negative electrode active material and the potential of the reduction peak on the cyclic voltammetry curve of the negative electrode active material substrate is 1.5 V-2.1 V, more optionally 1.7 V-1.95 V. Thus, the composite negative electrode active material can have an appropriate lithium storage function, which is beneficial to increasing the capacity per gram and the initial coulombic efficiency of the composite negative electrode active material, and then is conducive to improving the energy density of a secondary battery.

In any embodiment of the present application, the infrared spectrogram of the composite negative electrode active material has a first absorption peak at a wavenumber of $1396\pm41$ cm$^{-1}$ and a second absorption peak at a wavenumber of $1782\pm53$ cm$^{-1}$, and optionally the height ratio of the first absorption peak to the second absorption peak is $1.75\pm0.1$. The composite negative electrode active material of the present application has a C—N stretching vibration peak at $1396\pm41$ cm$^{-1}$ and a C=O stretching vibration peak at $1782\pm53$ cm$^{-1}$.

In any embodiment of the present application, the conductive polymer layer comprises a conductive polymer, the conductive polymer includes polyimide, the polyimide has a ketone carbonyl in the main chain structure thereof, and the molar ratio of the ketone carbonyl C=O to the imide ring C(=O)—N—C(=O) is 0.5 or more, optionally 0.5 to 2, more optionally 0.5 to 1. This is helpful for the composite negative electrode active material to present a cyclic voltammetry curve having an appropriate oxidation peak potential and reduction peak potential, such that on the one hand, the fast lithium storage can be achieved and the lithium storage current can be shared to reduce the damage of the current to the negative electrode active material substrate, and on the other hand, the lithium intercalation pressure of the negative electrode active material substrate can also be shared and the energy density of a secondary battery can be improved. In addition, this is also beneficial to reducing the concentration of lithium ions on the negative electrode side, thereby decreasing the concentration polarization.

In any embodiment of the present application, the polyimide is obtained by polymerizing a dianhydride monomer having a ketone carbonyl C=O in the main chain structure thereof with a diamine monomer. This is helpful for the composite negative electrode active material to present a cyclic voltammetry curve having an appropriate oxidation peak potential and reduction peak potential.

In any embodiment of the present application, the monomer unit of the polyimide is represented by formula 1, Formula 1

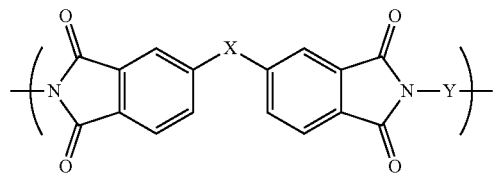

wherein X represents at least one of the group consisting of the following groups having a ketone carbonyl C=O in the main chain structure thereof: an alkyl group, an alicyclic group, an aliphatic heterocyclic group, an aromatic group, and a heteroaromatic group; and Y represents a chain aliphatic diamine monomer residue, an alicyclic diamine monomer residue, or an aromatic diamine monomer residue.

In any embodiment of the present application, optionally, X represents any one of the following groups:

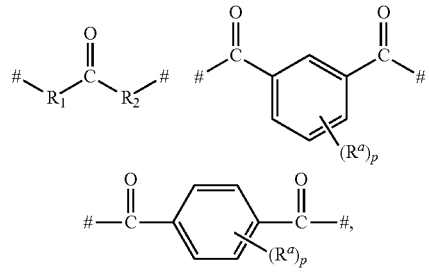

wherein $R_1$ and $R_2$ each independently represent a C0-C12 divalent alkyl group, C3-C12 divalent alicyclic group, C1-C12 divalent aliphatic heterocyclic group, C6-C30 divalent aromatic group or C2-C30 divalent heteroaromatic group, which is unsubstituted or substituted with $R^a$, p represents 0, 1, 2, 3 or 4, $R^a$ at each occurrence independently represents at least one of a halogen atom, C1-C6 alkyl, C1-C6 alkoxy, and C1-C6 haloalkyl, and #represents the linking position.

In any embodiment of the present application, optionally, Y represents any one of the following groups:

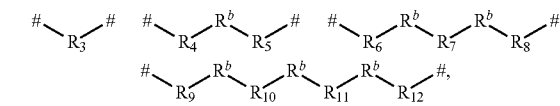

wherein $R_3$ to $R_{12}$ each independently represent a C1-C12 divalent alkyl group, C3-C12 divalent alicyclic group, C1-C12 divalent aliphatic heterocyclic group, C6-C30 divalent aromatic group or C2-C30 divalent heteroaromatic group, which is unsubstituted or substituted with $R^a$, $R^b$ at each occurrence independently represents —O—, —S—, or —C(=O)—, $R^a$ represents at least one of a halogen atom, C1-C6 alkyl, C1-C6 alkoxy, and C1-C6 haloalkyl, and #represents the linking position.

In any embodiment of the present application, optionally, Y represents any one of the following groups:

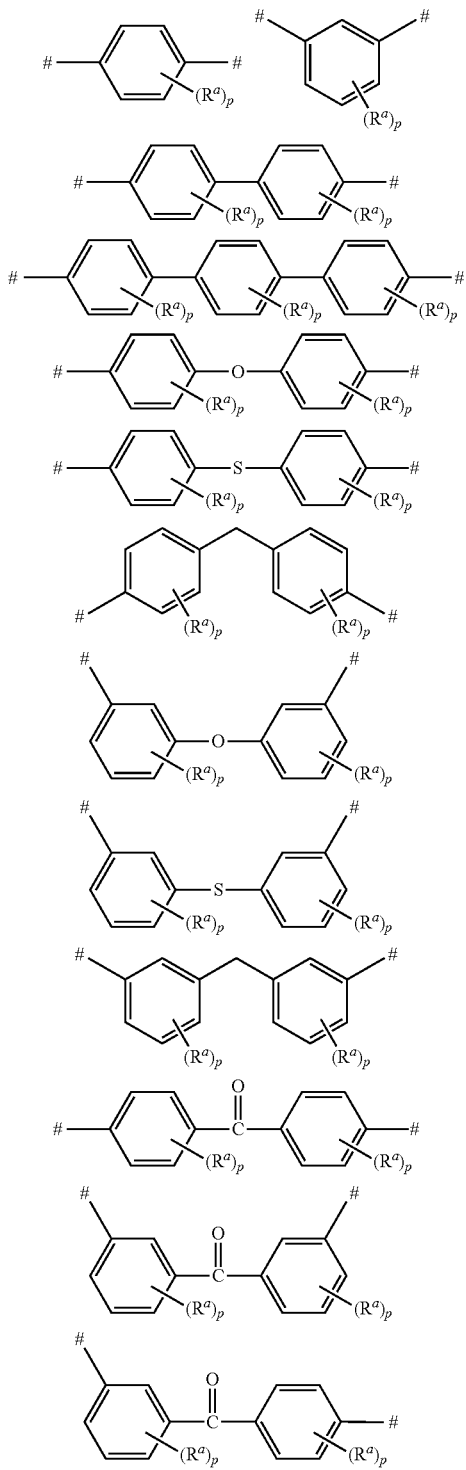

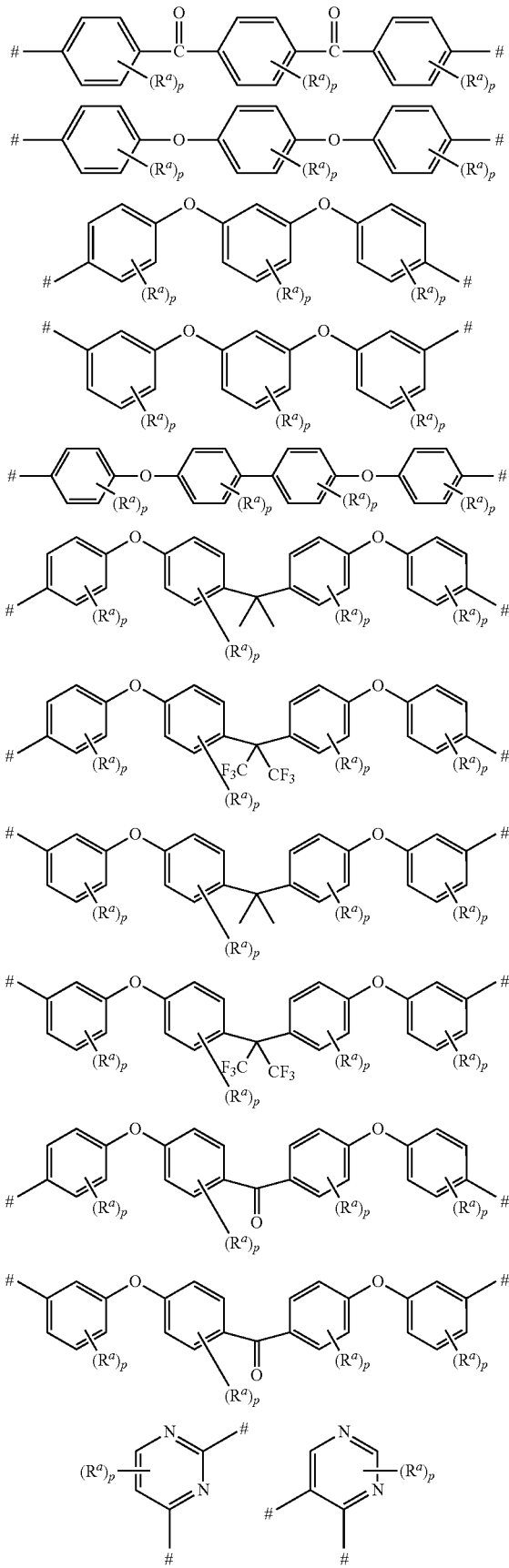

-continued

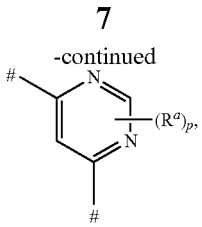

wherein #represents the linking position, p at each occurrence independently represents 0, 1, 2, 3 or 4, and $R^a$ at each occurrence independently represents at least one of a halogen atom, C1-C6 alkyl, C1-C6 alkoxy, and C1-C6 haloalkyl.

In any embodiment of the present application, the conductive polymer has a weight-average molecular weight of 30,000-100,000. Thus, the conductive polymer layer can combine a good flexibility, coating effect and resistance to electrolyte solution swelling.

In any embodiment of the present application, the conductive polymer has a glass transition temperature of 220° C.-260° C., optionally 240° C.-260° C. Thus, the conductive polymer layer can combine a good flexibility, coating effect and resistance to electrolyte solution swelling.

In any embodiment of the present application, the conductive polymer layer has a thickness of 50 nm or less, optionally 10 nm or less, more optionally 0.1 nm-7 nm. Thus, the conductive polymer layer can combine a good flexibility, coating effect and resistance to electrolyte solution swelling, and meanwhile, it is also beneficial for the composite negative electrode active material to combine a high capacity per gram and a high initial coulombic efficiency.

In any embodiment of the present application, the composite negative electrode active material has an average particle size of 3 μm-15 μm, optionally 5 μm-10 μm, more optionally 5 μm-8 μm. Thus, it is beneficial to improving the properties for transporting lithium ions and electrons, thereby further improving the dynamic properties of a secondary battery.

In any embodiment of the present application, the negative electrode active material substrate includes at least one selected from the following materials which are prelithiated or non-prelithiated: a carbon-based material, a silicon-based material, and a tin-based material; optionally, the carbon-based material includes at least one selected from graphite, soft carbon and hard carbon; optionally, the silicon-based material includes at least one selected from elemental silicon, a silicon oxide, and a silicon alloy; and optionally, the tin-based material includes at least one selected from elemental tin, a tin oxide, and a tin alloy.

In any embodiment of the present application, the negative electrode active material substrate is a prelithiated silicon oxide. Thus, it can further improve the energy density of a secondary battery.

In any embodiment of the present application, the prelithiated silicon oxide comprises: a silicon oxide substrate inner core; a lithium silicate intermediate layer on the surface of the silicon oxide substrate inner core, comprising lithium silicate crystal grains and silicon and/or silicon dioxide nano crystal grains; and a carbon coating layer on the surface of the lithium silicate intermediate layer. Optionally, the lithium silicate crystal grains include $Li_2SiO_3$ crystal grains. Thus, the capacity performance of a secondary battery can be improved and the volume expansion of the composite negative electrode active material can be reduced, thus the safety performance and cycle life of the secondary battery can be also improved.

In any embodiment of the present application, the mass ratio of the lithium silicate crystal grains to the silicon and/or silicon dioxide nano crystal grains in the lithium silicate intermediate layer is (10-50):(50-90).

In any embodiment of the present application, the lithium silicate intermediate layer has a thickness of ≤35 nm, optionally 15 nm-35 nm. Thus, the initial coulombic efficiency and the capacity per gram of the composite negative electrode active material can be increased.

In any embodiment of the present application, the carbon coating layer has a thickness of ≤25 nm, optionally 15 nm-25 nm. Thus, the electrical conductivity of the composite negative electrode active material can be improved, and the dissolving of lithium residues into the negative electrode slurry and electrolyte solution can also be inhibited.

A second aspect of the present application provides a method for preparing the composite negative electrode active material of the first aspect of the present application, the method comprising the following steps: S1: providing a negative electrode active material substrate, a dianhydride monomer having a ketone carbonyl C═O in the main chain structure thereof, a diamine monomer and a solvent, optionally the diamine monomer including at least one selected from a chain aliphatic diamine monomer, an alicyclic diamine monomer, and an aromatic diamine monomer; S2: dissolving the diamine monomer into the solvent to obtain a solution in which the diamine monomer is dissolved; S3: under a protective gas atmosphere, adding the negative electrode active material substrate to the solution in which the diamine monomer is dissolved and stirring and mixing same until uniform, and then adding the dianhydride monomer having a ketone carbonyl C═O in the main chain structure thereof and stirring and mixing same until uniform, subjecting same to a polymerization reaction, followed by washing and drying to obtain a prepolymer; and S4: under a protective gas atmosphere, subjecting the prepolymer obtained in S3 to an imidization reaction, and obtaining the composite negative electrode active material at the end of the reaction; wherein the composite negative electrode active material comprises a negative electrode active material substrate and a conductive polymer layer on the surface of the negative electrode active material substrate, and the cyclic voltammetry curve of the composite negative electrode active material has an oxidation peak within a range of 3.2 V-3.6 V and a reduction peak within a range of 2.1 V-2.6 V.

In the present application, the composite negative electrode active material is prepared by means of an in-situ polymerization method, which enables the conductive polymer layer to have a more uniform thickness and achieves a better binding effect between the conductive polymer layer and the negative electrode active material substrate. In the preparation method of the present application, the use of a dianhydride monomer having a ketone carbonyl C═O in the main chain structure thereof and a diamine monomer, described above, as raw materials can also beneficial to making the conductive polymer layer to have a good flexibility and thus be able to continuously protect the negative electrode active material substrate, thereby enabling a secondary battery to have a longer cycle life.

In any embodiment of the present application, a staged thermal insulation process is used in the imidization reaction in S4.

In any embodiment of the present application, optionally, the staged thermal insulation process comprises: a first stage of warming up to 100±15° C. at a rate of 3° C./min-5° C./min and holding at the temperature for 1 h-1.5 h; a second stage of warming up to 150±15° C. at a rate of 3° C./min-5° C./min and holding at the temperature for 1 h-1.5 h; a third stage of warming up to 200±15° C. at a rate of 3° C./min-5° C./min and holding at the temperature for 1 h-1.5 h; a fourth stage of warming up to 250±15° C. at a rate of 3° C./min-5° C./min and holding at the temperature for 1 h-1.5 h; and a fifth stage of warming up to 300±15° C. at a rate of 3° C./min-5° C./min and holding at the temperature for 1 h-1.5 h.

The use of the staged thermal insulation process above can achieve the best match of the solvent volatilization, the imidization temperature and the movement of conductive polymer molecular chains, which is beneficial for promoting the orderly arrangement of conductive polymer molecular chains to form a crystalline structure.

In any embodiment of the present application, the molar ratio of the diamine monomer to the dianhydride monomer having a ketone carbonyl C═O in the main chain structure thereof is ≥2:1, optionally (2.1-2.8):1.

In any embodiment of the present application, the solvent is an aprotic polar solvent, optionally including at least one selected from N,N-dimethylformamide, N,N-dimethylacetamide, and N-methylpyrrolidone.

In any embodiment of the present application, the dianhydride monomer having a ketone carbonyl C═O in the main chain structure thereof includes at least one selected from the following compounds:

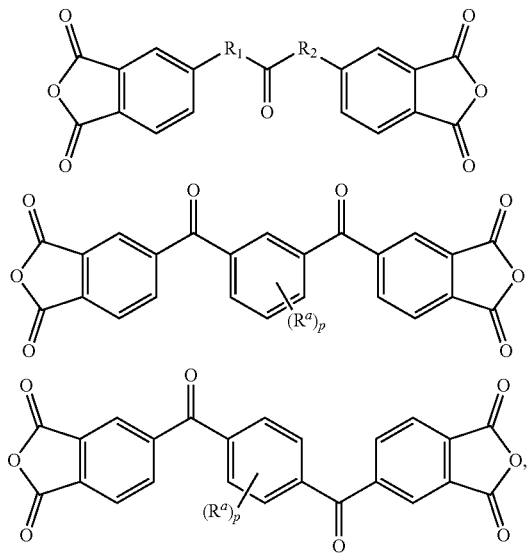

wherein $R_1$ and $R_2$ each independently represent a C0-C12 divalent alkyl group, C3-C12 divalent alicyclic group, C1-C12 divalent aliphatic heterocyclic group, C6-C30 divalent aromatic group or C2-C30 divalent heteroaromatic group, which is unsubstituted or substituted with $R^a$, p represents 0, 1, 2, 3 or 4, and $R^a$ at each occurrence independently represents at least one of a halogen atom, C1-C6 alkyl, C1-C6 alkoxy, and C1-C6 haloalkyl.

In any embodiment of the present application, optionally, the dianhydride monomer having a ketone carbonyl C═O in the main chain structure thereof includes at least one selected from the following compounds:

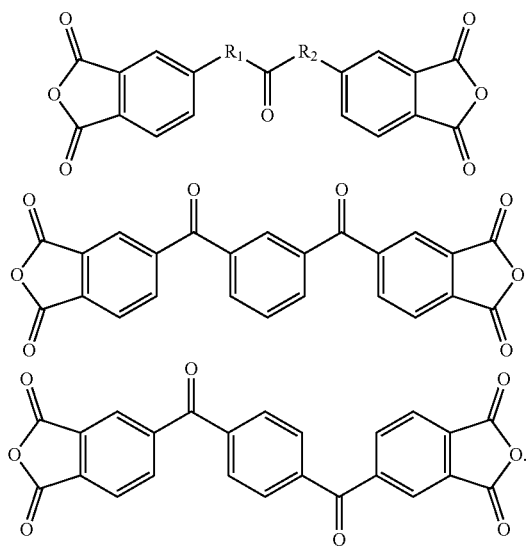

In any embodiment of the present application, the diamine monomer includes at least one selected from the following compounds:

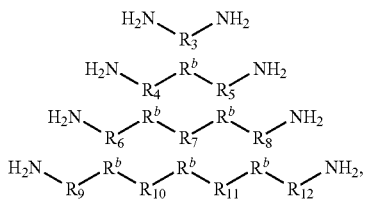

wherein $R_3$ to $R_{12}$ each independently represent a C1-C12 divalent alkyl group, C3-C12 divalent alicyclic group, C1-C12 divalent aliphatic heterocyclic group, C6-C30 divalent aromatic group or C2-C30 divalent heteroaromatic group, which is unsubstituted or substituted with $R^a$, $R^b$ at each occurrence independently represents —O—, —S—, or —C(═O)—, and $R^a$ represents at least one of a halogen atom, C1-C6 alkyl, C1-C6 alkoxy, and C1-C6 haloalkyl.

In any embodiment of the present application, optionally, the diamine monomer includes at least one selected from the following compounds:

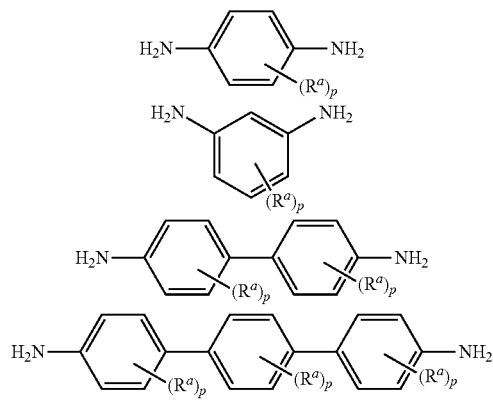

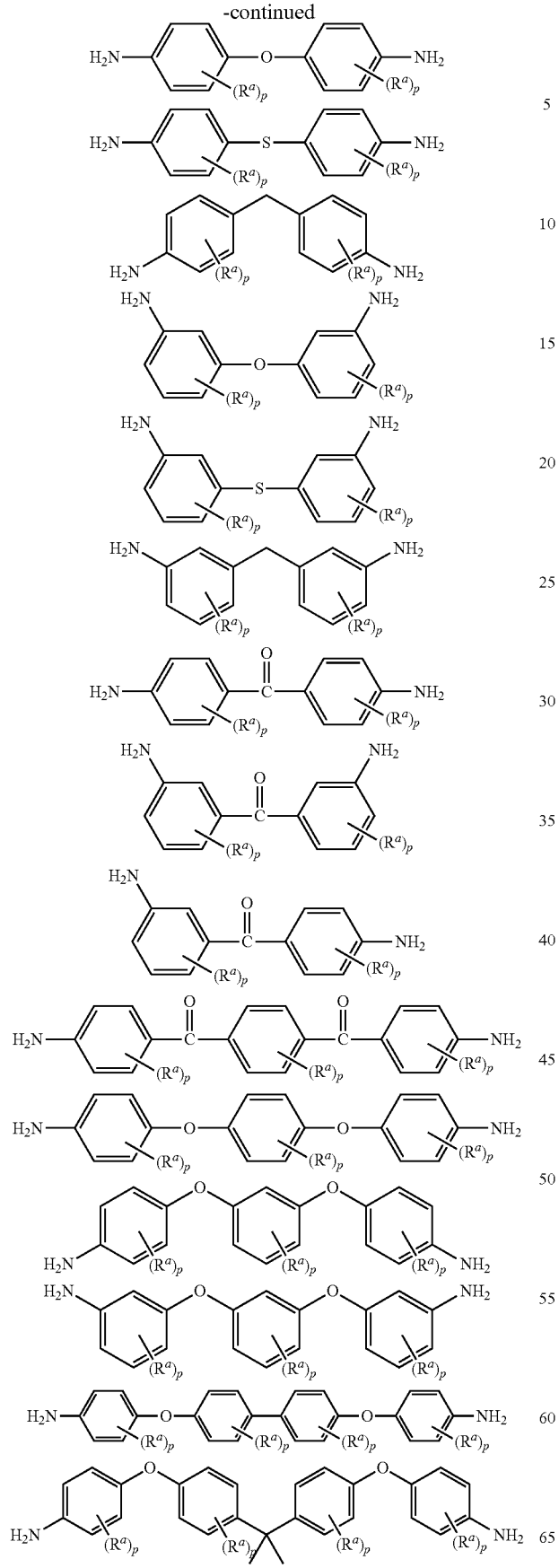
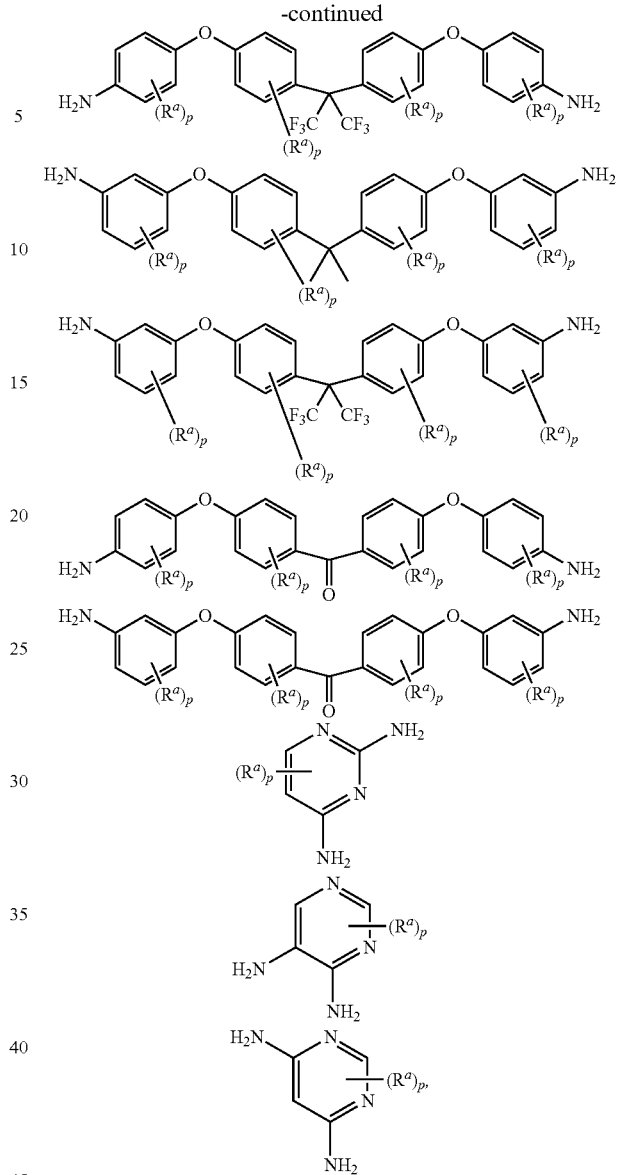
wherein p at each occurrence independently represents 0, 1, 2, 3 or 4, and $R^a$ at each occurrence independently represents at least one of a halogen atom, C1-C6 alkyl, C1-C6 alkoxy, and C1-C6 haloalkyl.
In any embodiment of the present application, optionally, the diamine monomer includes at least one selected from the following compounds:
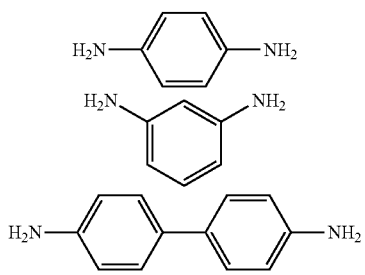

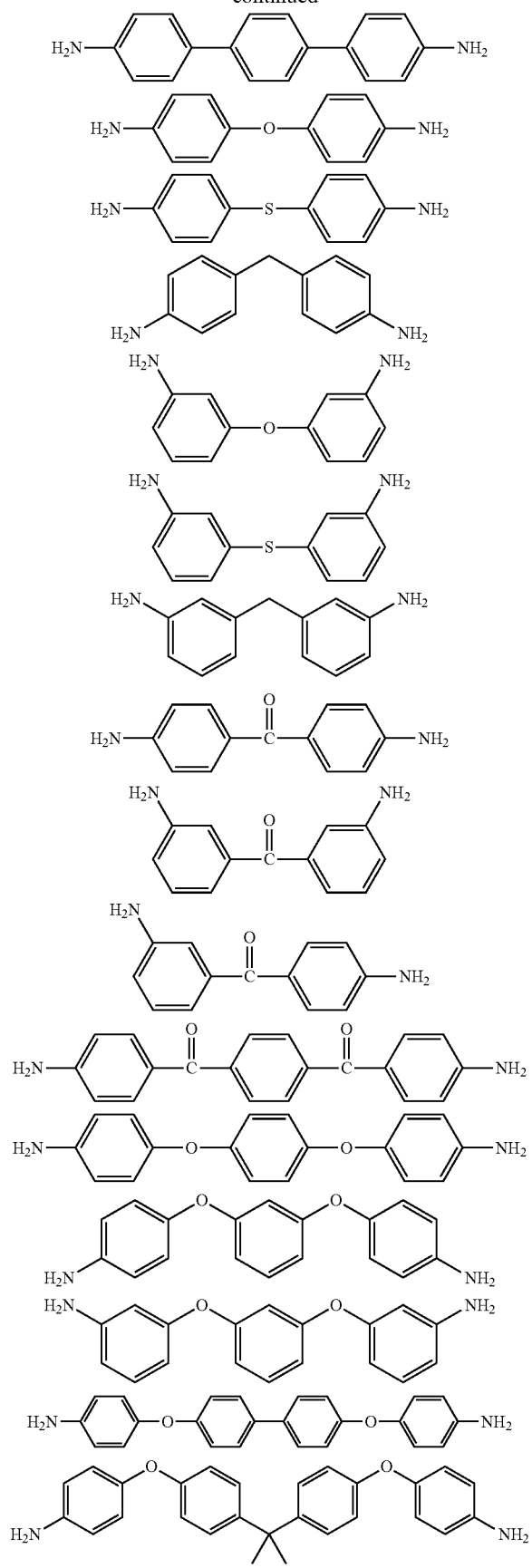
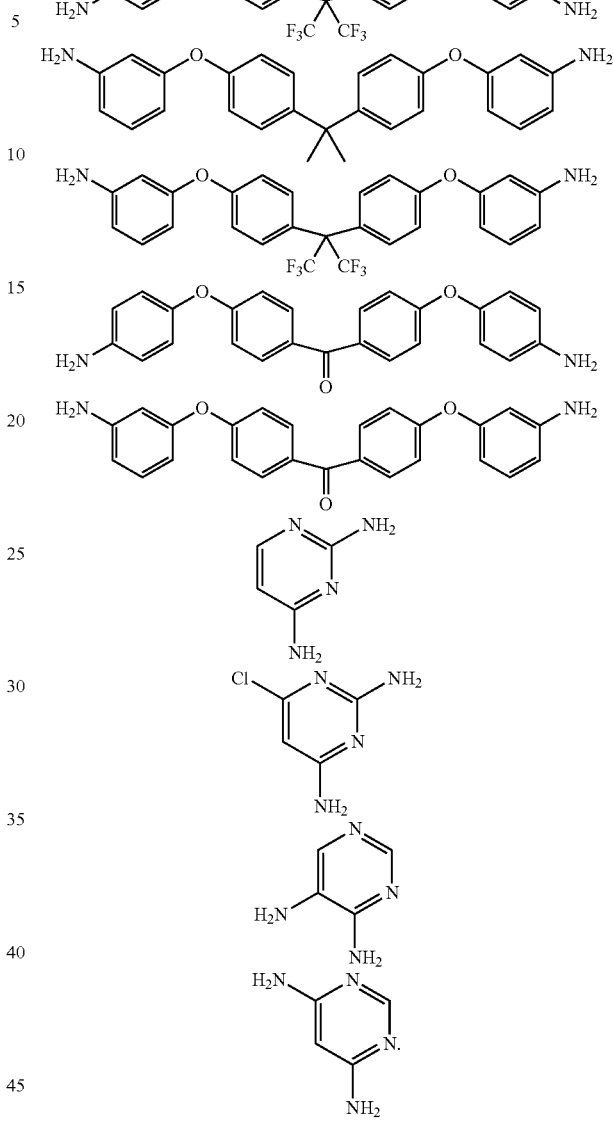

In any embodiment of the present application, the negative electrode active material substrate includes at least one selected from the following materials which are prelithiated or non-prelithiated: a carbon-based material, a silicon-based material, and a tin-based material, and optionally is a prelithiated silicon oxide.

In any embodiment of the present application, optionally, the prelithiated silicon oxide comprises: a silicon oxide substrate inner core; a lithium silicate intermediate layer on the surface of the silicon oxide substrate inner core, comprising lithium silicate crystal grains and silicon and/or silicon dioxide nano crystal grains; and a carbon coating layer on the surface of the lithium silicate intermediate layer. Optionally, the lithium silicate crystal grains include $Li_2SiO_3$ crystal grains.

A third aspect of the present application provides a negative electrode plate comprising a negative electrode current collector and a negative electrode film layer on the surface of the negative electrode current collector, wherein the negative electrode film layer comprises a composite negative electrode active material of the first aspect of the present application or a composite negative electrode active material prepared by a method of the second aspect of the present application, and the mass percentage content of the composite negative electrode active material in the negative electrode film layer is 1% to 99%, optionally 5% to 30%, based on the total mass of the negative electrode film layer.

A fourth aspect of the present application provides a secondary battery comprising the negative electrode plate of the third aspect of the present application.

A fifth aspect of the present application provides a power consuming device, comprising the secondary battery of the fourth aspect of the present application.

The composite negative electrode active material provided by the present application can combine a low volume expansion, a high capacity per gram and a high initial coulombic efficiency, thus enabling a secondary battery to combine a low volume expansion, a high energy density and a long cycle life. The power consuming device of the present application comprises the secondary battery provided by the present application, and thus has at least the same advantages as the secondary battery.

BRIEF DESCRIPTION OF THE DRAWINGS

In order to illustrate the technical solutions of the examples of the present application more clearly, the drawings used in the examples of the present application will be described briefly below. Apparently, the drawings described below are merely some embodiments of the present application, and those of ordinary skill in the art may derive other drawings from these drawings without creative efforts.

DETAILED DESCRIPTION OF EMBODIMENTS

Figure 1:
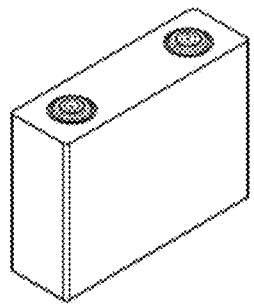
FIG. 1 shows a schematic diagram of an embodiment of a secondary battery of the present application.

Hereinafter, embodiments of the composite negative electrode active material and the preparation method therefor, the negative electrode plate comprising same, the secondary battery, and the power consuming device of the present application are specifically disclosed with reference to the accompanying drawings as appropriate. However, unnecessary detailed illustrations may be omitted in some instances. For example, there are situations where detailed description of well-known items and repeated description of actually identical structures are omitted. This is to prevent the following description from being unnecessarily verbose, and facilitates understanding by those skilled in the art. Moreover, the accompanying drawings and the descriptions below are provided for enabling those skilled in the art to fully understand the present application, rather than limiting the subject matter disclosed in the claims.

The "ranges" disclosed in the present application are defined in the form of lower and upper limits. A given range is defined by selecting a lower limit and an upper limit, and the selected lower and upper limits defining the boundaries of the particular range. Ranges defined in this manner may be inclusive or exclusive, and may be arbitrarily combined, that is, any lower limit may be combined with any upper limit to form a range. For example, if the ranges 60-120 and 80-110 are listed for a particular parameter, it should be understood that the ranges 60-110 and 80-120 are also contemplated. Additionally, if minimum range values 1 and 2 are listed and maximum range values 3, 4, and 5 are listed, the following ranges are all contemplated: 1-3, 1-4, 1-5, 2-3, 2-4, and 2-5. In the present application, unless stated otherwise, the numerical range "a-b" denotes an abbreviated representation of any combination of real numbers between a and b, where both a and b are real numbers. For example, the numerical range "0-5" means that all the real numbers between "0-5" have been listed herein, and "0-5" is just an abbreviated representation of combinations of these numerical values. In addition, when a parameter is expressed as an integer ≥2, it is equivalent to disclosing that the parameter is, for example, an integer of 2, 3, 4, 5, 6, 7, 8, 9, 10, 11, 12, etc.

Unless otherwise stated, all the embodiments and optional embodiments of the present application may be combined with one another to form new technical solutions, and such technical solutions should be considered to be included in the disclosure of the present application.

Unless otherwise stated, all the technical features and optional technical features of the present application may be combined with one another to form new technical solutions, and such technical solutions should be considered to be included in the disclosure of the present application.

Unless otherwise stated, all the steps of the present application may be performed sequentially or randomly, preferably sequentially. For example, the method comprising steps (a) and (b) indicates that the method may comprise steps (a) and (b) performed sequentially, or may also comprise steps (b) and (a) performed sequentially. For example, reference to "the method may further comprise step (c)"

indicates that step (c) may be added to the method in any order, e.g., the method may comprise steps (a), (b), and (c), steps (a), (c), and (b), or also steps (c), (a), and (b), etc.

The terms "comprise" and "include" mentioned in the present application are open-ended or may also be closed-ended, unless otherwise stated. For example, "comprise" and "include" may mean that other components not listed may further be comprised or included, or only the listed components may be comprised or included.

In the present application, the term "or" is inclusive unless otherwise specified. For example, the phrase "A or B" means "A, B, or both A and B". More specifically, the condition "A or B" is satisfied by any one of the following: A is true (or present) and B is false (or not present); A is false (or not present) and B is true (or present); or both A and B are true (or present).

In the present application, the term "more" refers to two or more.

In the present application, the representation of a single bond through a single- or multiple-ring system refers to that the single bond can be attached at any accessible position of the single- or multiple-ring system.

Throughout the specification, the substituents of compounds are disclosed in a manner of groups or scopes. It is explicitly expected that such a description includes each individual sub combination of the members in these groups and scopes. For example, it is explicitly expected that the term "C1-C6 alkyl" individually discloses C1, C2, C3, C4, C5, C6, C1-C6, C1-C5, C1-C4, C1-C3, C1-C2, C2-C6, C2-C5, C2-C4, C2-C3, C3-C6, C3-C5, C3-C4, C4-C6, C4-C5 and C5-C6 alkyl.

The term "alicyclic group" refers to a carbon ring system with aliphatic characteristics, including alkyl, alkenyl, and alkynyl groups, the structure of which may be a single ring or multiple rings (such as a fused ring, bridged ring, and spiro ring). The example of the alicyclic group includes, but is not limited to, cyclopropyl, cyclobutyl, cyclopentyl, cyclohexyl, cycloheptyl, cyclopentenyl, cyclohexenyl, and cyclohexynyl.

The term "aliphatic heterocyclic group" refers to an alicyclic ring in which one or more atoms are elements other than carbon (e.g., N, O, S, etc.). The example of the aliphatic heterocyclic group includes, but is not limited to, a ethylene oxide group and an azacyclopropane group.

The term "aromatic group" refers to a carbon ring system with aromatic characteristics, the structure of which may be a single ring, multiple rings, or a fused ring. The example of the aromatic group includes, but is not limited to, phenyl, biphenyl (e.g., diphenyl, triphenyl), benzhydryl, naphthyl, and indenyl.

The term "heteroaromatic group" refers to an aromatic ring in which one or more atoms are elements other than carbon (e.g., N, O, S, etc.). The example of the heteroaromatic group includes, but is not limited to, pyrrolyl, furyl, thienyl, pyridyl, pyrimidyl, pyridazinyl, pyrazinyl, benzofuryl, and benzothienyl.

Unless otherwise stated, the terms used in the present application have the meaning well-known to those skilled in the art.

Unless otherwise stated, the values of the parameters mentioned in the present application may be determined by various measurement methods commonly used in the art, for example, may be determined according to the measurement methods provided in the present application.

A secondary battery, also known as a rechargeable battery or an accumulator, refers to a battery of which an active material can be activated by means of charging for reuse after the battery is discharged. During the charging and discharging of the battery, lithium ions are intercalated and de-intercalated back and forth between a positive electrode plate and a negative electrode plate, and a separator is arranged between the positive electrode plate and the negative electrode plate, mainly prevents positive and negative electrodes from short-circuiting and enables the passage of lithium ions. The positive electrode plate comprises a positive electrode current collector and a positive electrode film layer, the positive electrode film layer is usually formed by coating a positive electrode slurry onto the positive electrode current collector, followed by drying and cold pressing, and the positive electrode slurry is usually formed by dispersing components such as a positive electrode active material, a conductive agent and a binder into a solvent and stirring same until uniform. The negative electrode plate comprises a negative electrode current collector and a negative electrode film layer, the negative electrode film layer is usually formed by coating a negative electrode slurry onto the negative electrode current collector, followed by drying and cold pressing, and the negative electrode slurry is usually formed by dispersing components such as a negative electrode active material, a conductive agent and a binder into a solvent and stirring same until uniform.

A solid electrolyte interphase (SEI) film will be formed on the surface of the negative electrode active material when a secondary battery is charged for the first time, which can protect the negative electrode and avoid the direct contact between the negative electrode active material and the electrolyte solution, thereby reducing the electrolyte solution decomposition and active lithium ion consumption. However, when a secondary battery is charged, the negative electrode active material particles will undergo the corresponding volume expansion as the charging level increases. In this case, the SEI film on the surface of the negative electrode active material particles may crack due to its inability to withstand such a large volume expansion, such that the fresh negative electrode active material is exposed to the electrolyte solution, thus leading to the continuous decomposition of the electrolyte solution, the continuous consumption of active lithium ions, and the continuous growth and thickening of the SEI film and the side reaction product layer.

In order to reduce the volume expansion of the negative electrode active material, the strategy usually adopted at present is to coat the surface of the negative electrode active material with a conductive carbon layer. The conductive carbon layer can not only avoid the direct contact between the negative electrode active material and the electrolyte solution, but also can have an effect of inhibiting the volume expansion of the negative electrode active material. However, the carbonaceous precursor used to form a conductive carbon layer is easy to agglomerate the negative electrode active material to form a larger secondary particle morphology during the coating process, thereby reducing the compacted density of the negative electrode active material; and meanwhile, since the negative electrode active material has a larger particle size, additional crushing processes are required, which not only increases the energy consumption but also leads to the poor uniformity of particle size distribution of the negative electrode active material. In addition, the conductive carbon material in the conductive carbon layer is usually amorphous carbon, which is a short-range ordered and long-range disordered material with a relatively high rigidity, thus resulting in the problem of cracking or even breaking of the conductive carbon layer during the charging and discharging of a secondary battery. Once the conductive carbon layer cracks, the fresh negative electrode active material will be exposed to the electrolyte solution, which leads to the continuous decomposition of the electrolyte solution, the continuous consumption of active lithium ions, and the continuous growth and thickening of the SEI film and the side reaction product layer, thereby resulting in a secondary battery having an increased charge-transfer impedance and reduced fast charge/discharge efficiency and capacity.

Therefore, coating the surface of the negative electrode active material with a conductive carbon layer cannot effectively improve the volume expansion and capacity performance of the negative electrode active material, and thus it is also difficult for a secondary battery to combine a low volume expansion, a high energy density, and a long cycle life.

The inventors of the present application have conducted extensive studies and provide a new composite negative electrode active material that can combine a low volume expansion, a high capacity per gram and a high initial coulombic efficiency, thus enabling a secondary battery to combine a low volume expansion, a high energy density and a long cycle life.

Composite Negative Electrode Active Material

Specifically, a first aspect of the present application provides a composite negative electrode active material comprising a negative electrode active material substrate and a conductive polymer layer on the surface of the negative electrode active material substrate, wherein the cyclic voltammetry curve of the composite negative electrode active material has an oxidation peak within a range of 3.2 V-3.6 V and a reduction peak within a range of 2.1 V-2.6 V.

In the present application, the negative electrode active material substrate can be completely or partially coated by the "conductive polymer layer".

After extensive studies, the inventors of the present application have found that by means of providing a conductive polymer layer on the surface of the negative electrode active material substrate and making the cyclic voltammetry curve of the composite negative electrode active material show an oxidation peak within a range of 3.2 V-3.6 V and a reduction peak within a range of 2.1 V-2.6 V, the resulting composite negative electrode active material can combine a low volume expansion, a high capacity per gram and a high initial coulombic efficiency.

Different from a traditional conductive carbon coating layer, the coating layer in the present application is a conductive polymer layer, such that the coating layer has a relatively small rigidity and a good flexibility, is less likely to crack during the charging and discharging of a secondary battery and thus can continuously protect the negative electrode active material substrate, thereby avoiding the direct contact between the negative electrode active material substrate and an electrolyte solution and avoiding the continuous consumption of active lithium ions and the continuous growth and thickening of an SEI film and a side reaction product layer. The conductive polymer layer of the present application comprises a conductive polymer. Different from a traditional conductive polymer (e.g., polyaniline, polypyrrole, polythiophene, etc.), the conductive polymer used in the conductive polymer layer of the present application can enable the composite negative electrode active material to have a higher oxidation peak potential and reduction peak potential, such that the conductive polymer layer of the present application also has a lithium storage function, which can, on the one hand, share the lithium storage current and reduce the damage of the current to the negative electrode active material substrate, and on the other side, can share the lithium intercalation pressure of the negative electrode active material substrate and increase the energy density of the secondary battery. In addition, the conductive polymer layer of the present application is also beneficial to reducing the concentration of lithium ions on the negative electrode side, thereby decreasing the concentration polarization. Therefore, when the composite negative electrode active material of the present application is applied to a secondary battery, such a secondary battery can combine a low volume expansion, a high energy density and a long cycle life.

In some embodiments, the cyclic voltammetry curve of the composite negative electrode active material has an oxidation peak within a range of 3.3 V-3.55 V. Thus, the composite negative electrode active material can have an appropriate delithiation function, which is beneficial to increasing the capacity per gram and the initial coulombic efficiency of the composite negative electrode active material, and then is conducive to improving the energy density of a secondary battery.

In some embodiments, the cyclic voltammetry curve of the composite negative electrode active material has a reduction peak within a range of 2.2 V-2.45 V. Thus, the composite negative electrode active material can have an appropriate lithium storage function, which is beneficial to increasing the capacity per gram and the initial coulombic efficiency of the composite negative electrode active material, and then is conducive to improving the energy density of a secondary battery.

In some embodiments, the potential of the oxidation peak on the cyclic voltammetry curve of the composite negative electrode active material is higher than the potential of the oxidation peak on the cyclic voltammetry curve of the negative electrode active material substrate, and optionally, the difference between the potential of the oxidation peak on the cyclic voltammetry curve of the composite negative electrode active material and the potential of the oxidation peak on the cyclic voltammetry curve of the negative electrode active material substrate is 2.4 V-2.8 V, more optionally 2.5 V-2.75 V. Thus, the composite negative electrode active material can have an appropriate delithiation function, which is beneficial to increasing the capacity per gram and the initial coulombic efficiency of the composite negative electrode active material, and then is conducive to improving the energy density of a secondary battery.

In some embodiments, the potential of the reduction peak on the cyclic voltammetry curve of the composite negative electrode active material is higher than the potential of the reduction peak on the cyclic voltammetry curve of the negative electrode active material substrate, and optionally, the difference between the potential of the reduction peak on the cyclic voltammetry curve of the composite negative electrode active material and the potential of the reduction peak on the cyclic voltammetry curve of the negative electrode active material substrate is 1.5 V-2.1 V, more optionally 1.7 V-1.95 V. Thus, the composite negative electrode active material can have an appropriate lithium storage function, which is beneficial to increasing the capacity per gram and the initial coulombic efficiency of the composite negative electrode active material, and then is conducive to improving the energy density of a secondary battery.

The cyclic voltammetry curves of the composite negative electrode active material and the negative electrode active material substrate are obtained according to the following test method comprising:

(1) providing a negative electrode plate comprising the composite negative electrode active material or the negative electrode active material substrate;

(2) preparing a button cell: using a metal lithium plate as a counter electrode, an electrolyte solution with 1 mol/L of lithium hexafluorophosphate ($LiPF_6$) as a solute and a mixed solution of ethylene carbonate (EC) and dimethyl carbonate (DMC) at a volume ratio of 1:1 as a solvent, and a glass fiber as a separator, and assembling same with the negative electrode plate to form a button cell in a glove box filled with argon (the content of both water and oxygen was 0.1 ppm or less), and leaving the packaged button cell to stand in the glove box for 12 hours or more for aging same; and (3) Performing a cyclic voltammetry test: subjecting the resulting button cell to a cyclic voltammetry test using an electrochemical workstation (e.g., a CHI 660 electrochemical workstation from Shanghai Chenhua Instrument Co., Ltd.) to obtain the cyclic voltammetry curve of the composite negative electrode active material and the negative electrode active material substrate respectively, wherein the scanning voltage for the composite negative electrode active material is 2.0 V-4.3 V (no peak appears when the voltage is less than 2.0 V), the scanning voltage for the negative electrode active material substrate is 0 V-2.0 V (no peak appears when the voltage is above 2.0 V), and the scanning rate is 0.1 mV/s.

It should be noted that for the cyclic voltammetry test above for the composite negative electrode active material and the negative electrode active material substrate, samples can be obtained during the preparation of the negative electrode plate and tested, or samples can be obtained from a prepared secondary battery and tested.

In an embodiment, the negative electrode plate in step (1) above can be prepared as follows: the composite negative electrode active material or the negative electrode active material substrate, acetylene black, and polyvinylidene fluoride (PVDF) are well mixed at a mass ratio of 7:2:1, and then added to N-methylpyrrolidone (NMP) and mixed until uniform to obtain a slurry; and the slurry is evenly coated onto a copper foil and dried in a vacuum drying oven at 120° C. for 12 h to obtain the negative electrode plate.

When the sample is obtained from a prepared secondary battery and tested, for example, the sampling can be carried out according to the method below.

The secondary battery is discharged (for safety, the secondary battery is generally in a full-discharged state); the secondary battery is disassembled, and the negative electrode plate is taken out and soaked in dimethyl carbonate (DMC) for a certain time period (e.g., 2 h-10 h); and the negative electrode plate is then taken out and dried at a certain temperature for a certain time period (e.g., 60° C., 4 h), and then, the dried negative electrode plate is taken out. A button cell is assembled using the dried negative electrode plate according to the method above and subjected to the cyclic voltammetry test, thus obtaining the cyclic voltammetry curve of the composite negative electrode active material.

The secondary battery is discharged (for safety, the secondary battery is generally in a full-discharged state); the secondary battery is disassembled, and the negative electrode plate is taken out and soaked with N,N-dimethylformamide (DMF) for a certain time period (e.g., 12 h or more) to remove the conductive polymer layer on the surface of the composite negative electrode active material; and the negative electrode plate is then taken out and dried at a certain temperature for a certain time period (e.g., 60° C., 4 h), and then, the dried negative electrode plate is taken out. A button cell is assembled using the dried negative electrode plate according to the method above and subjected to the cyclic voltammetry test, thus obtaining the cyclic voltammetry curve of the negative electrode active material substrate.

In some embodiments, the infrared spectrogram of the composite negative electrode active material has a first absorption peak at a wavenumber of $1396\pm41$ $cm^{-1}$ and a second absorption peak at a wavenumber of $1782\pm53$ $cm^{-1}$, and optionally the height ratio of the first absorption peak to the second absorption peak is $1.75\pm0.1$. The composite negative electrode active material of the present application has a C—N stretching vibration peak at $1396\pm41$ $cm^{-1}$ and a C=O stretching vibration peak at $1782\pm53$ $cm^{-1}$.

In the present application, the composite negative electrode active material can be analyzed by means of infrared spectroscopy by using instruments and methods well known in the art, for example, an infrared spectrometer (such as, a ThermoFisher Nicolet iS10 fourier transform infrared spectrometer), according to the GB/T 6040-2019 General rules for infrared analysis.

In the present application, the height ratio of the first absorption peak to the second absorption peak may be based on the original peak height or the baseline corrected peak height.

In some embodiments, the conductive polymer layer comprises a conductive polymer, the conductive polymer includes polyimide (PI), the polyimide has a ketone carbonyl in the main chain structure thereof, and the molar ratio of the ketone carbonyl C=O to the imide ring C(=O)—N—C(=O) is 0.5 or more. When the polyimide has a proper content of ketone carbonyl C=O in the main chain structure thereof, it is helpful for the composite negative electrode active material to present a cyclic voltammetry curve having an appropriate oxidation peak potential and reduction peak potential, such that on the one hand, the fast lithium storage can be achieved and the lithium storage current can be shared to reduce the damage of the current to the negative electrode active material substrate, and on the other hand, the lithium intercalation pressure of the negative electrode active material substrate can also be shared and the energy density of a secondary battery can be improved. In addition, when the polyimide has a proper content of ketone carbonyl C=O in the main chain structure thereof, it is also beneficial to reducing the concentration of lithium ions on the negative electrode side, thereby decreasing the concentration polarization.

In some embodiments, optionally, the molar ratio of the ketone carbonyl C=O to the imide ring C(=O)—N—C(=O) in the main chain structure of the polyimide is 0.5 to 2, more optionally 0.5 to 1. This can prevent the potential of the oxidation peak on the cyclic voltammetry curve of the composite negative electrode active material from shifting to an excessively high voltage to result in the failure of some lithium ions to be successfully de-intercalated.

In some embodiments, optionally, the polyimide is obtained by polymerizing a dianhydride monomer having a ketone carbonyl C=O in the main chain structure thereof with a diamine monomer. The main chain structure of the diamine monomer may have or may be devoid of ketone carbonyl C=O. This is helpful for the composite negative electrode active material to present a cyclic voltammetry curve having an appropriate oxidation peak potential and reduction peak potential.

In the present application, the "polyimide" refers to a type of polymers having an imide ring C(=O)—N—C(=O) in the main chain structure thereof, and the "ketone carbonyl" refers to a carbonyl group with both ends thereof directly attached to carbon atoms, for example, both ends of the carbonyl group are optionally attached directly to carbon atoms in an alkyl group, an alicyclic group, an aliphatic heterocyclic group, an aromatic group, a heteroaromatic group, etc.

In some embodiments, the monomer unit of the polyimide is represented by formula 1,

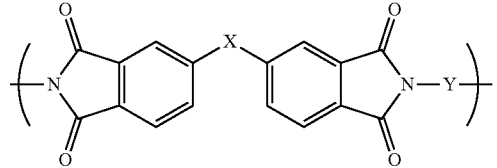

Formula 1 wherein X represents at least one of the group consisting of the following groups having a ketone carbonyl C=O in the main chain structure thereof: an alkyl group, an alicyclic group, an aliphatic heterocyclic group, an aromatic group, and a heteroaromatic group; and Y represents a chain aliphatic diamine monomer residue, an alicyclic diamine monomer residue, or an aromatic diamine monomer residue. The chain aliphatic diamine is a general term given to the diamine compounds that have two amino groups (—NH$_2$) attached to a chain hydrocarbon compound and derivatives thereof, the alicyclic diamine is a general term given to the diamine compounds that have two amino groups (—NH$_2$) attached to an alicyclic compound and derivatives thereof, and the aromatic diamine is a general term given to the diamine compounds that have two amino groups (—NH$_2$) attached to an aromatic compound and derivatives thereof. The diamine monomer residue refers to the remaining group of a diamine compound after losing two amino groups (—NH$_2$).

In some embodiments, optionally, X represents any one of the following groups:

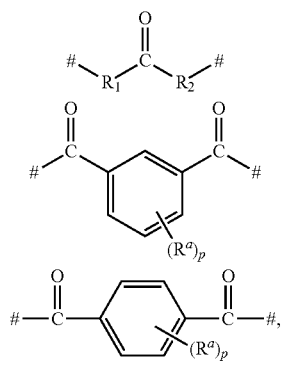

wherein $R_1$ and $R_2$ each independently represent a C0-C12 divalent alkyl group, C3-C12 divalent alicyclic group, C1-C12 divalent aliphatic heterocyclic group, C6-C30 divalent aromatic group or C2-C30 divalent heteroaromatic group, which is unsubstituted or substituted with $R^a$, p represents 0, 1, 2, 3 or 4, $R^a$ at each occurrence independently represents at least one of a halogen atom, C1-C6 alkyl, C1-C6 alkoxy, and C1-C6 haloalkyl, and #represents the linking position.

In the present application, when $R_1$ and/or $R_2$ is a C0 divalent alkyl group, it means that $R_1$ and/or $R_2$ is not present, that is,

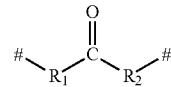

may be

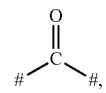

or

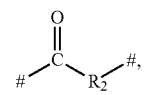

or

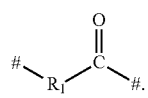

In some embodiments, optionally, Y represents any one of the following groups:

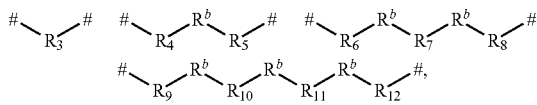

wherein $R_3$ to $R_{12}$ each independently represent a C1-C12 divalent alkyl group, C3-C12 divalent alicyclic group, C1-C12 divalent aliphatic heterocyclic group, C6-C30 divalent aromatic group or C2-C30 divalent heteroaromatic group, which is unsubstituted or substituted with $R^a$, $R^b$ at each occurrence independently represents —O—, —S—, or —C(=O)—, $R^a$ represents at least one of a halogen atom, C1-C6 alkyl, C1-C6 alkoxy, and C1-C6 haloalkyl, and #represents the linking position.

In some embodiments, optionally, Y represents any one of the following groups:

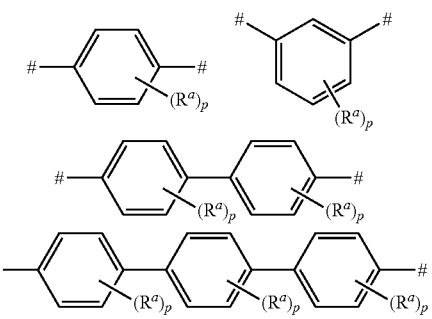

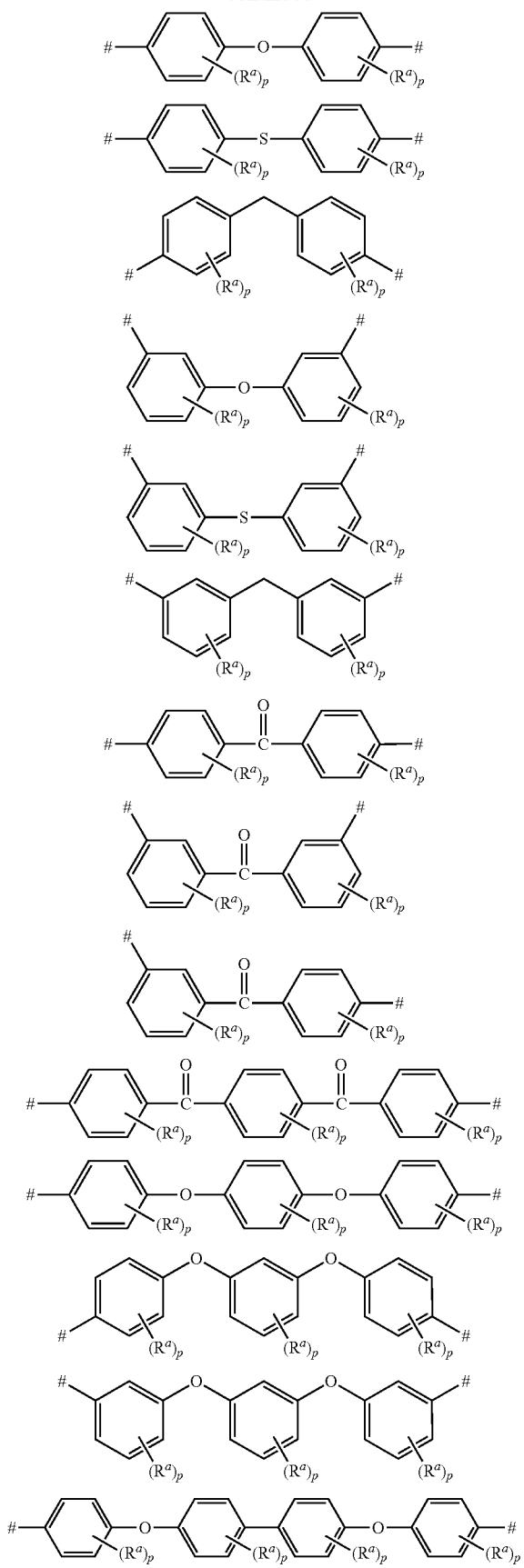
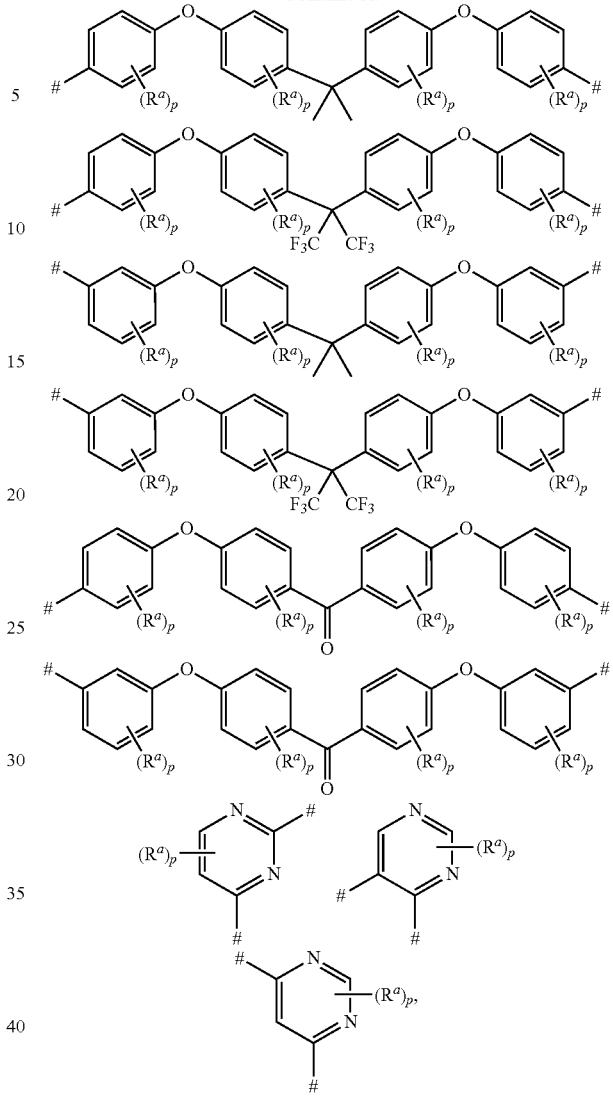

wherein #represents the linking position, p at each occurrence independently represents 0, 1, 2, 3 or 4, and $R^a$ at each occurrence independently represents at least one of a halogen atom, C1-C6 alkyl, C1-C6 alkoxy, and C1-C6 haloalkyl.

In formula 1, the heteroatom in the aliphatic heterocyclic group and heteroaromatic group may include at least one selected from N, O and S, and optionally, the heteroatom in the heteroaromatic group is N. The halogen atom and the halogen atom in the haloalkyl group may include at least one selected from F, Cl and Br.

In some embodiments, the conductive polymer has a weight-average molecular weight of 30,000-100,000. The conductive polymer of the present application is an oligomer, and when the weight-average molecular weight thereof is in a suitable range, the conductive polymer layer can combine a good flexibility, coating effect and resistance to electrolyte solution swelling. Moreover, the following situations can be effectively avoided: when the weight-average molecular weight of the conductive polymer is too small, the conductive polymer may be dissolved in the electrolyte solution, which in turn leads to no coating effect; and when the weight-average molecular weight of the conductive polymer is too large, the conductive polymer will be converted from an oligomer to a high polymer, such that the conductive polymer layer may have a poor flexibility and is easy to crack.

In the present application, the weight-average molecular weight of the conductive polymer is a well-known meaning in the art and can be determined by instruments and methods well-known in the art. For example, the composite negative electrode active material or a negative electrode plate comprising same can be immersed into N,N-dimethylformamide (DMF), such that the conductive polymer is dissolved in DMF, then the solution is collected by means of a syringe, and the weight-average molecular weight is then determined by means of gel permeation chromatography (GPC), high performance liquid chromatography (HPLC), etc.

In some embodiments, the conductive polymer has a glass transition temperature (Tg) of ≤260° C., optionally 220° C.-260° C., more optionally 240° C.-260° C. When the conductive polymer of the present application has a proper glass transition temperature, the conductive polymer layer can combine a good flexibility, coating effect and resistance to electrolyte solution swelling.

In the present application, the glass transition temperature of the conductive polymer is a well-known meaning in the art and can be determined by instruments and methods well-known in the art. For example, the composite negative electrode active material or a negative electrode plate comprising same can be immersed into N,N-dimethylformamide (DMF), such that the conductive polymer is dissolved in DMF, then heated to volatilize DMF to obtain a conductive polymer test sample, and the glass transition temperature of which is then determined by means of differential scanning calorimetry with reference to GB/T 29611-2013. The test instrument may be a DSC-3 model differential scanning calorimeter from Mettler-Toledo.

In some embodiments, the conductive polymer layer has a thickness of 50 nm or less, optionally 10 nm or less, more optionally 0.1 nm-7 nm. When the conductive polymer layer has a thickness in a suitable range, the conductive polymer layer can combine a good flexibility, coating effect and resistance to electrolyte solution swelling, and meanwhile, it is also beneficial for the composite negative electrode active material to combine a high capacity per gram and a high initial coulombic efficiency.

In the present application, the thickness of the conductive polymer layer is a well-known meaning in the art and can be determined by instruments and methods well-known in the art. For example, a transmission electron microscope can be used for measurement, such that the boundary region between the conductive polymer layer and the negative electrode active material substrate can be determined in a more accurate manner. In order to ensure the accuracy of the measurements, multiple (e.g., 30 or more) thickness values at different positions can be randomly taken in a TEM image obtained from a sample to be measured (e.g., the composite negative electrode active material or a negative electrode plate comprising same) by using a transmission electron microscope, and the average value is taken as the thickness of the conductive polymer layer.

In some embodiments, the composite negative electrode active material has an average particle size of 3 μm-15 μm, optionally 5 μm-10 μm, more optionally 5 μm-8 μm. When the composite negative electrode active material has an average particle size in a suitable range, it is beneficial to improving the properties for transporting lithium ions and electrons, thereby further improving the dynamic properties of a secondary battery.

In the present application, the average particle size of the composite negative electrode active material is a well-known meaning in the art and can be determined by instruments and methods well-known in the art. For example, the SEM images of the composite negative electrode active material or a negative electrode plate comprising same can be obtained by using a scanning electron microscope (e.g., ZEISS Sigma 300), a measurement region with a length of 100 μm and a width of 100 μm is randomly selected in the SEM image, the length of the longest diagonal of all composite negative electrode active material particles within this region is counted to obtain a particle size distribution curve, and the particle size corresponding to the particle size distribution percentages reaching 50% is taken as the average particle size of the composite negative electrode active material.

In some embodiments, the negative electrode active material substrate includes at least one selected from the following materials which are prelithiated or non-prelithiated: a carbon-based material, a silicon-based material, and a tin-based material; optionally, the carbon-based material includes at least one selected from graphite, soft carbon and hard carbon; optionally, the silicon-based material includes at least one selected from elemental silicon, a silicon oxide, and a silicon alloy; and optionally, the tin-based material includes at least one selected from elemental tin, a tin oxide, and a tin alloy.

In some embodiments, optionally, the negative electrode active material substrate includes at least one selected from silicon-based materials and tin-based materials which are prelithiated or non-prelithiated.

Carbon-based materials are the most commonly used negative electrode active materials for secondary batteries, but their theoretical capacity per gram is relatively low, which results in very limited space for improving the energy density of secondary batteries. Silicon-based and tin-based materials have the advantage of a high theoretical capacity per gram and thus can improve the energy density of secondary batteries, but have drawbacks such as severe volume expansion, easy pulverization, and low initial coulombic efficiency. Coating the surface of a silicon-based material and a tin-based material with the conductive polymer layer of the present application can inhibit the volume expansion of the silicon-based material and the tin-based material; moreover, since the conductive polymer layer of the present application has a good flexibility and is less likely to crack during the charging and discharging of a secondary battery, the silicon-based material and the tin-based material can be continuously protected, which avoids the continuous consumption of active lithium ions and the continuous growth and thickening of the SEI film and the side reaction product layer, thereby enabling a secondary battery to combine a high energy density and a long cycle life; and in addition, the conductive polymer in the conductive polymer layer of the present application also has fast lithium storage and delithiation functions, which can compensate for the low initial coulombic efficiency of the silicon-based material and the tin-based material, thus enabling a secondary battery to have a better capacity performance.

In some embodiments, optionally, the negative electrode active material substrate is a prelithiated silicon oxide. Compared with a non-prelithiated silicon oxide, the prelithiated silicon oxide has a higher initial coulombic efficiency, which can further improve the energy density of a secondary battery.

In some embodiments, optionally, the prelithiated silicon oxide comprises a silicon oxide substrate inner core, a lithium silicate intermediate layer and a carbon coating layer, wherein the lithium silicate intermediate layer is located on the surface of the silicon oxide substrate inner core and comprises lithium silicate crystal grains and silicon and/or silicon dioxide nano crystal grains, and the carbon coating layer is located on the surface of the lithium silicate intermediate layer.

In some embodiments, the prelithiated silicon oxide may further comprise lithium residues, such as, including at least one selected from LiOH, Li, LiH, $Li_2O$ and $Li_2CO_3$. These lithium residues are the remaining lithium-containing substances that are not fully reacted during the pre-lithiation of the silicon oxides and generated during the pre-lithiation process of silicon oxides. The lithium residues may be dissolved out and dissolved in a solvent (e.g., water) during the preparation of a negative electrode slurry, thus may raise the pH of the negative electrode slurry, which may lead to the decrease in the viscosity of the negative electrode slurry and the decrease in the binding strength of the negative electrode plate; and in addition, the lithium residues may also react with a solvent in an electrolyte solution to produce hydrogen that is flammable and explosive during the charging and discharging of a secondary battery, which can also cause serious safety hazards.

The inventors of the present application have found from further studies that in addition to the functions of fast lithium storage and delithiation, which can compensate for the low initial coulombic efficiency of a silicon oxide, the conductive polymer in the conductive polymer layer of the present application further can avoid the contact and reaction between the lithium residues that are not fully reacted during the pre-lithiation process and the electrolyte solution, which can further improve the cycle life of a secondary battery. In addition, the conductive polymer layer of the present application also can protect the carbon coating layer in the prelithiated silicon oxide and effectively inhibit the carbon coating layer from cracking and breaking.

In some embodiments, optionally, the lithium silicate crystal grains include $Li_2SiO_3$ crystal grains. Thus, the capacity performance of a secondary battery can be improved and the volume expansion of the composite negative electrode active material can be reduced, thus the safety performance and cycle life of the secondary battery can be also improved.

In some embodiments, the content of silicon element in the prelithiated silicon oxide may be 50 wt %-70 wt %.

In some embodiments, the prelithiated silicon oxide may be a commercially available product, or optionally, prepared by the following method: mixing a silicon oxide with a Li precursor and subjecting same to a heat treatment, followed by mixing with a carbonaceous precursor and subjecting same to a heat treatment under a protective atmosphere to obtain the prelithiated silicon oxide. Optionally, the Li precursor includes at least one selected from LiOH, Li, LiH, $Li_2O$ and $Li_2CO_3$. Optionally, the carbonaceous precursor includes at least one selected from asphalt, a phenolic resin, an epoxy resin, starch, glucose, and cellulose.

In some embodiments, the mass ratio of the lithium silicate crystal grains to the silicon and/or silicon dioxide nano crystal grains in the lithium silicate intermediate layer is (10-50):(50-90), for example, the mass ratio may be 10:90, 15:85, 20:80, 25:75, 30:70, 35:65, 40:60, 45:55, 50:50 or a range composed of any of the above values.

In some embodiments, the lithium silicate intermediate layer has a thickness of ≤35 nm, optionally 15 nm-35 nm. Thus, the initial coulombic efficiency and the capacity per gram of the composite negative electrode active material can be increased.

In some embodiments, the carbon coating layer has a thickness of ≤25 nm, optionally 15 nm-25 nm. Thus, the electrical conductivity of the composite negative electrode active material can be improved, and the dissolving of lithium residues into the negative electrode slurry and electrolyte solution can also be inhibited.

In some embodiments, the composite negative electrode active material comprises a negative electrode active material substrate and a conductive polymer layer on the surface of the negative electrode active material substrate, wherein the cyclic voltammetry curve of the composite negative electrode active material has an oxidation peak within a range of 3.2 V-3.6 V and a reduction peak within a range of 2.1 V-2.6 V; the negative electrode active material substrate is a prelithiated silicon-based material, optionally a prelithiated silicon oxide; the conductive polymer layer comprises a conductive polymer, the conductive polymer includes polyimide, and the monomer unit of the polyimide is as represented by formula 1, wherein X represents at least one of the group consisting of the following groups having a ketone carbonyl C=O in the main chain structure thereof: an alkyl group, an alicyclic group, an aliphatic heterocyclic group, an aromatic group, and a heteroaromatic group; and Y represents a chain aliphatic diamine monomer residue, an alicyclic diamine monomer residue, or an aromatic diamine monomer residue; and the conductive polymer has a weight-average molecular weight of 30,000-100,000. Thus, the composite negative electrode active material can combine a low volume expansion, a high capacity per gram and a high initial coulombic efficiency, thus enabling a secondary battery to better combine a low volume expansion, a high energy density and a long cycle life.

Formula 1

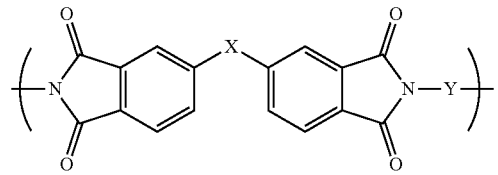

Preparation Method

A second aspect of the present application provides a method for preparing a composite negative electrode active material of the first aspect of the present application by means of an in-situ polymerization method.

Specifically, the method comprises the following steps: S1: providing a negative electrode active material substrate, a dianhydride monomer having a ketone carbonyl C=O in the main chain structure thereof, a diamine monomer and a solvent; S2: dissolving the diamine monomer into the solvent to obtain a solution in which the diamine monomer is dissolved; S3: under a protective gas atmosphere, adding the negative electrode active material substrate to the solution in which the diamine monomer is dissolved and stirring and mixing same until uniform, and then adding the dianhydride monomer having a ketone carbonyl C=O in the main chain structure thereof and stirring and mixing same until uniform, subjecting same to a polymerization reaction, followed by washing and drying to obtain a prepolymer; and S4: under a protective gas atmosphere, subjecting the prepolymer obtained in S3 to an imidization reaction, and obtaining the composite negative electrode active material at the end of the reaction; wherein the composite negative electrode active material comprises a negative electrode active material substrate and a conductive polymer layer on the surface of the negative electrode active material substrate, and the cyclic voltammetry curve of the composite negative electrode active material has an oxidation peak within a range of 3.2 V-3.6 V and a reduction peak within a range of 2.1 V-2.6 V.

In some embodiments, a staged thermal insulation process is used in the imidization reaction in S4.

Optionally, the staged thermal insulation process comprises: a first stage of warming up to 100±15° C. at a rate of 3° C./min-5° C./min and holding at the temperature for 1 h-1.5 h; a second stage of warming up to 150±15° C. at a rate of 3° C./min-5° C./min and holding at the temperature for 1 h-1.5 h; a third stage of warming up to 200±15° C. at a rate of 3° C./min-5° C./min and holding at the temperature for 1 h-1.5 h; a fourth stage of warming up to 250±15° C. at a rate of 3° C./min-5° C./min and holding at the temperature for 1 h-1.5 h; and a fifth stage of warming up to 300±15° C. at a rate of 3° C./min-5° C./min and holding at the temperature for 1 h-1.5 h.

The use of the staged thermal insulation process above can achieve the best match of the solvent volatilization, the imidization temperature and the movement of conductive polymer molecular chains, which is beneficial for promoting the orderly arrangement of conductive polymer molecular chains to form a crystalline structure.

In the staged thermal insulation process of the present application, the first stage mainly aims at volatilizing the solvent in the system, and the second to fourth stages mainly aim at a progressive polycondensation to increase the imidization level in a step-wise manner, thus ensuring a more gentle imidization reaction.

In some embodiments, the molar ratio of the diamine monomer to the dianhydride monomer having a ketone carbonyl C=O in the main chain structure thereof is ≥2:1, optionally (2.1-2.8):1.

In some embodiments, the solvent may be an aprotic polar solvent, optionally including at least one selected from N,N-dimethylformamide (DMF), N,N-dimethylacetamide (DMAc), and N-methylpyrrolidone (NMP).

In some embodiments, the dianhydride monomer having a ketone carbonyl C=O in the main chain structure thereof can include at least one selected from the following compounds:

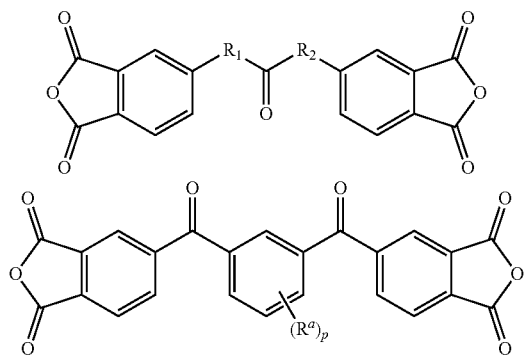

-continued

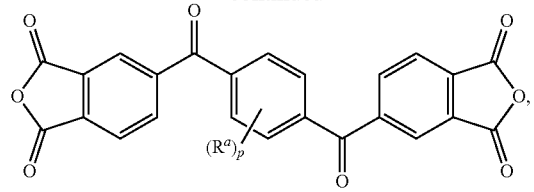

wherein $R_1$ and $R_2$ each independently represent a C0-C12 divalent alkyl group, C3-C12 divalent alicyclic group, C1-C12 divalent aliphatic heterocyclic group, C6-C30 divalent aromatic group or C2-C30 divalent heteroaromatic group, which is unsubstituted or substituted with $R^a$, p represents 0, 1, 2, 3 or 4, and $R^a$ at each occurrence independently represents at least one of a halogen atom, C1-C6 alkyl, C1-C6 alkoxy, and C1-C6 haloalkyl.

As an example, the dianhydride monomer having a ketone carbonyl C=O in the main chain structure thereof can include at least one selected from the following compounds:

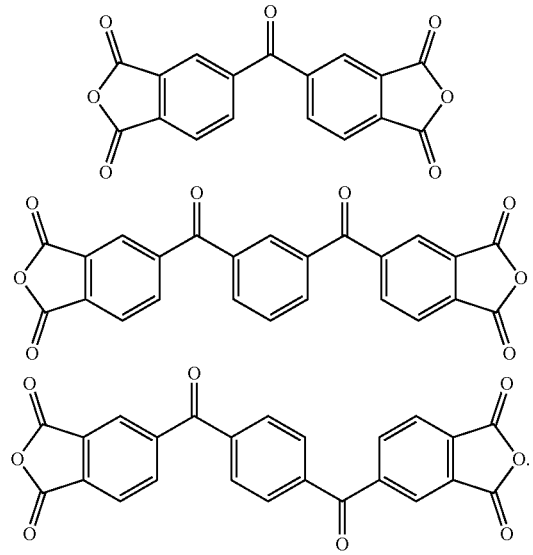

In some embodiments, the diamine monomer may include at least one selected from an aliphatic diamine monomer, an alicyclic diamine monomer, and an aromatic diamine monomer, and optionally, the diamine monomer is an aromatic diamine monomer.

In some embodiments, the diamine monomer may include at least one selected from the following compounds:

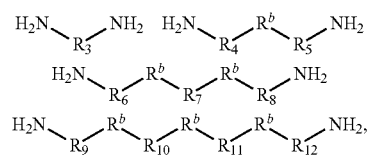

wherein $R_3$ to $R_{12}$ each independently represent a C1-C12 divalent alkyl group, C3-C12 divalent alicyclic group, C1-C12 divalent aliphatic heterocyclic group, C6-C30 divalent aromatic group or C2-C30 divalent heteroaromatic group, which is unsubstituted or substituted with $R^a$, $R^b$ at each occurrence independently represents —O—, —S—, or —C(=O)—, and $R^a$ represents at least one of a halogen atom, C1-C6 alkyl, C1-C6 alkoxy, and C1-C6 haloalkyl.

In some embodiments, optionally, the diamine monomer may include at least one selected from the following compounds:

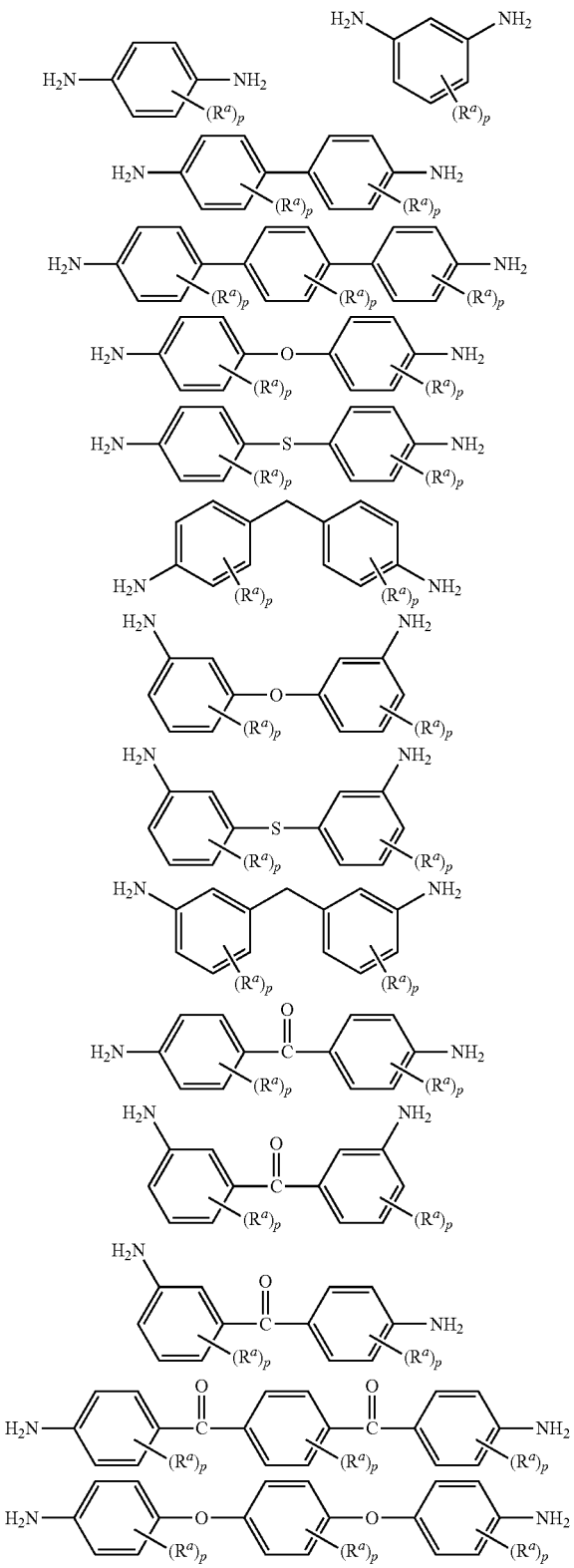

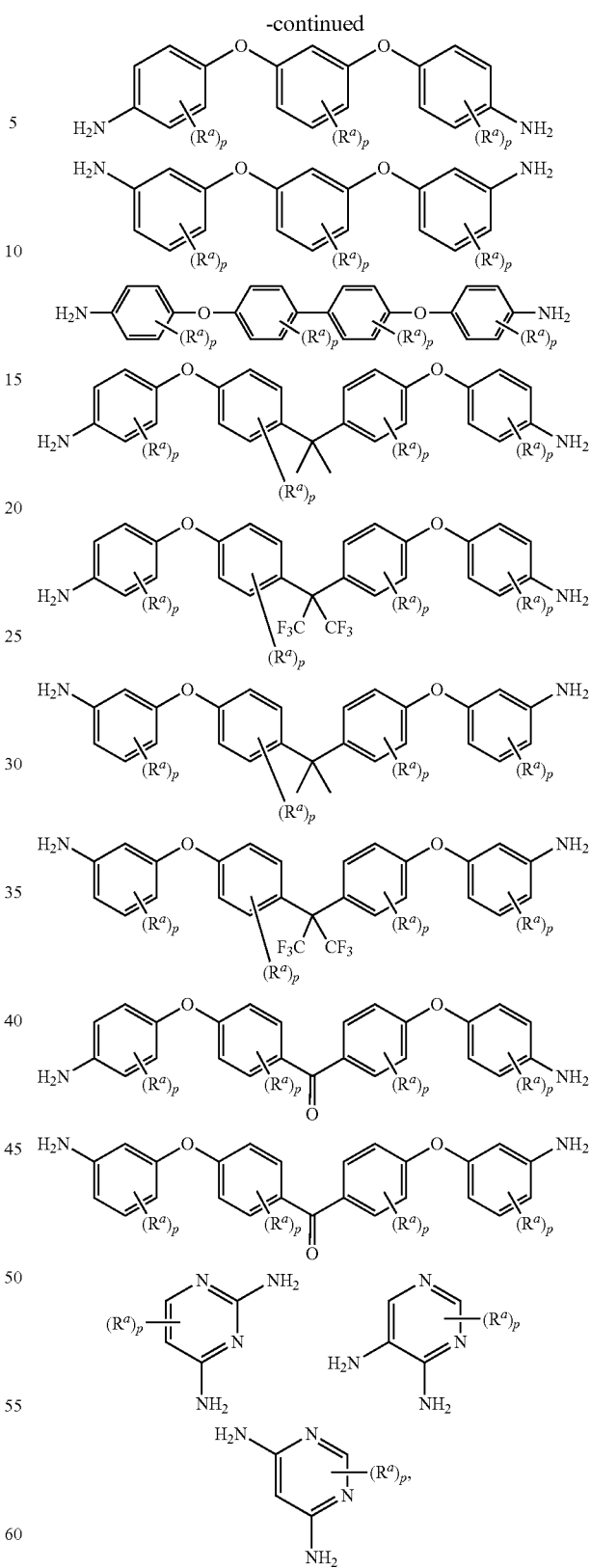

wherein p at each occurrence independently represents 0, 1, 2, 3 or 4, and $R^a$ at each occurrence independently represents at least one of a halogen atom, C1-C6 alkyl, C1-C6 alkoxy, and C1-C6 haloalkyl.

As an example, the diamine monomer may include at least one selected from the following compounds:

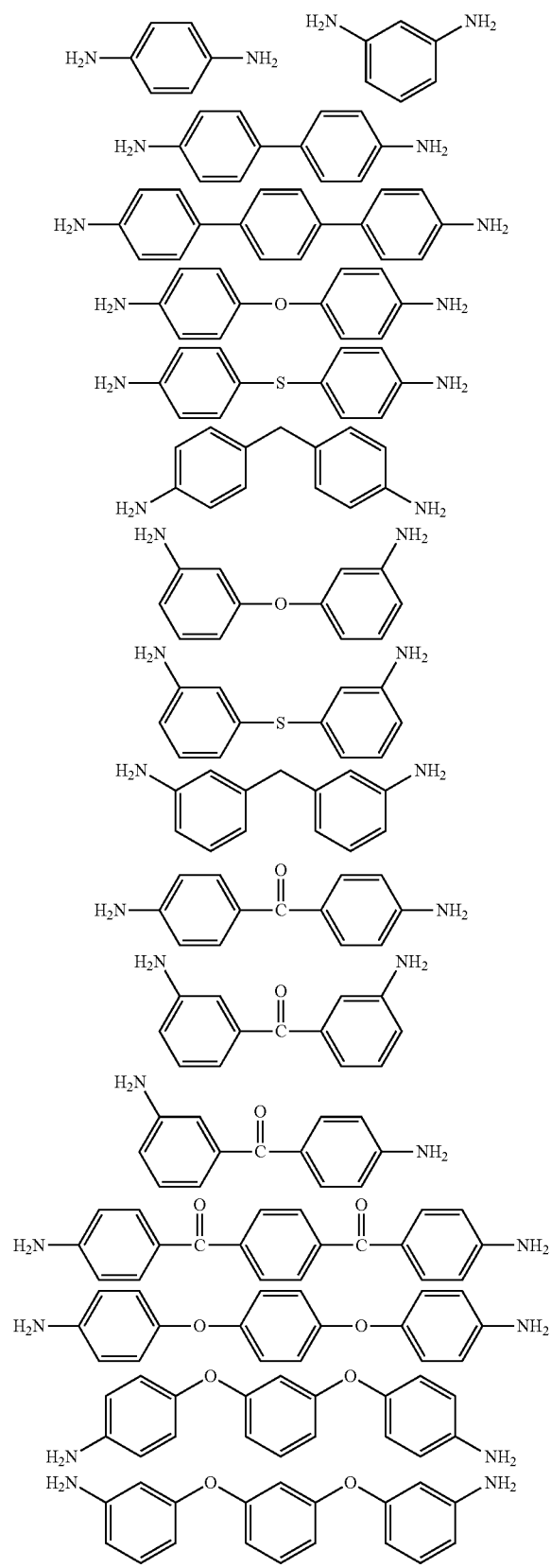

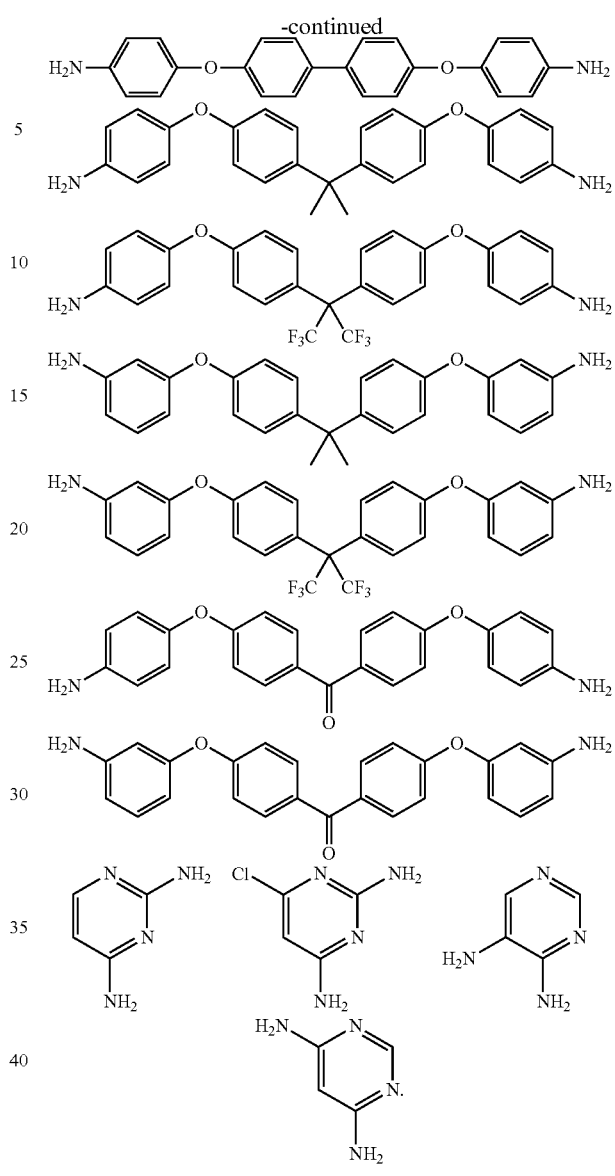

In some embodiments, the negative electrode active material substrate includes at least one selected from the following materials which are prelithiated or non-prelithiated: a carbon-based material, a silicon-based material, and a tin-based material, and optionally is a prelithiated silicon oxide. Optionally, the prelithiated silicon oxide comprises a silicon oxide substrate inner core, a lithium silicate intermediate layer and a carbon coating layer, wherein the lithium silicate intermediate layer is located on the surface of the silicon oxide substrate inner core and comprises lithium silicate crystal grains and silicon and/or silicon dioxide nano crystal grains, and the carbon coating layer is located on the surface of the lithium silicate intermediate layer. Optionally, the lithium silicate crystal grains include $Li_2SiO_3$ crystal grains.

In the present application, the composite negative electrode active material is prepared by means of an in-situ polymerization method, which enables the conductive polymer layer to have a more uniform thickness and achieves a better binding effect between the conductive polymer layer and the negative electrode active material substrate. In the preparation method of the present application, the use of a dianhydride monomer having a ketone carbonyl C=O in the main chain structure thereof and a diamine monomer, described above, as raw materials can also beneficial to making the conductive polymer layer to have a good flexibility and thus be able to continuously protect the negative electrode active material substrate, thereby enabling a secondary battery to have a longer cycle life.

The preparation method of the second aspect of the present application can be used to prepare a composite negative electrode active material in any embodiment of the first aspect of the present application, and the specific types and contents of raw materials used during the preparation can refer to the composite negative electrode active material of the first aspect of the present application and the details therefor are not described herein again.

Negative Electrode Plate

A third aspect of the present application provides a negative electrode plate comprising a negative electrode current collector and a negative electrode film layer on the surface of the negative electrode current collector, wherein the negative electrode film layer comprises a composite negative electrode active material of the first aspect of the present application or a composite negative electrode active material prepared by a method of the second aspect of the present application, and the mass percentage content of the composite negative electrode active material in the negative electrode film layer is 1% to 99%, optionally 5% to 30%, based on the total mass of the negative electrode film layer.

The negative electrode current collector has two opposite surfaces in the thickness direction thereof, and the negative electrode film layer is provided on either or both of the two opposite surfaces of the negative electrode current collector.

The negative electrode film layer does not exclude other negative electrode active materials other than the composite negative electrode active material described above, and the other negative electrode active materials may be one well-known in the art for secondary batteries. As an example, the other negative electrode active materials may include at least one selected from natural graphite, artificial graphite, soft carbon and hard carbon.

In some embodiments, the negative electrode film layer may further optionally comprise a negative electrode conductive agent. In the present application, the type of the negative electrode conductive agent is not particularly limited. As an example, the negative electrode conductive agent may include at least one selected from superconducting carbon, conductive graphite, acetylene black, carbon black, Ketjen black, carbon dots, carbon nanotubes, graphene, and carbon nanofibers.

In some embodiments, the negative electrode film layer may also optionally comprise a negative electrode binder. In the present application, the type of the negative electrode binder is not particularly limited. As an example, the negative electrode binder may include at least one selected from styrene-butadiene rubber (SBR), water-soluble unsaturated resin SR-1B, an aqueous acrylic resin (for example, polyacrylic acid (PAA), polymethacrylic acid (PMAA), and sodium polyacrylate (PAAS)), polyacrylamide (PAM), polyvinyl alcohol (PVA), sodium alginate (SA), and carboxymethyl chitosan (CMCS).

In some embodiments, the negative electrode film layer may further optionally comprise other auxiliary agents. As an example, the other auxiliary agents may include a thickener, for example, sodium carboxymethyl cellulose (CMC) and a PTC thermistor material.

In some embodiments, the negative electrode current collector may be a metal foil or a composite current collector. As an example of the metal foil, a copper foil may be used. The composite current collector may comprise a polymer material base layer and a metal material layer formed on at least one surface of the polymer material base layer. As an example, the metal material may include at least one selected from copper, a copper alloy, nickel, a nickel alloy, titanium, a titanium alloy, silver, and a silver alloy. As an example, the polymer material base layer may include at least one selected from polypropylene (PP), polyethylene terephthalate (PET), polybutylene terephthalate (PBT), polystyrene (PS), and polyethylene (PE).

The negative electrode film layer is typically formed by coating a negative electrode slurry on the negative electrode current collector, followed by drying and cold pressing. The negative electrode slurry is generally formed by dispersing a composite negative electrode active material, an optional conductive agent, an optional binder, and other optional auxiliary agents into a solvent and stirring same until uniform. The solvent may be N-methylpyrrolidone (NMP) or deionized water, but is not limited thereto.

The negative electrode plate does not exclude other additional functional layers in addition to the negative electrode film layer. For example, in some embodiments, the negative electrode plate of the present application further comprises a conductive primer layer (e.g., composed of a conductive agent and a binder) sandwiched between the negative electrode current collector and the negative electrode film layer and provided on the surface of the negative electrode current collector. In some other examples, the negative electrode plate of the present application further comprises a protective layer covering the surface of the negative electrode film layer.

Secondary Battery

A fourth aspect of the present application provides a secondary battery. A secondary battery, also known as a rechargeable battery or an accumulator, refers to a battery of which an active material can be activated by means of charging for reuse after the battery is discharged. Generally, the secondary battery comprises a positive electrode plate, a negative electrode plate, a separator and an electrolyte. The type of the secondary battery is not particularly limited in the present application. For example, the secondary battery may be a lithium ion battery, and particularly may be a lithium ion secondary battery.

[Negative Electrode Plate]

The negative electrode plate used in the secondary battery of the present application is a negative electrode plate in any embodiment of the third aspect of the present application, which enables a secondary battery to combine a low volume expansion, a high energy density and a long cycle life.

[Positive Electrode Plate]

The positive electrode plate comprises a positive electrode current collector and a positive electrode film layer which is provided on at least one surface of the positive electrode current collector and comprises a positive electrode active material. For example, the positive electrode current collector has two opposite surfaces in the thickness direction thereof and the positive electrode film layer is arranged on either or both of the two opposite surfaces of the positive electrode current collector.

The positive electrode active material may be a positive electrode active material for secondary batteries well-known in the art. For example, the positive electrode active material may include at least one of a lithium transition metal oxide, a lithium-containing phosphate, and the respective modified compounds thereof. Examples of the lithium transition metal oxide may include, but are not limited to, at least one of a lithium cobalt oxide, a lithium nickel oxide, a lithium manganese oxide, a lithium nickel cobalt oxide, a lithium manganese cobalt oxide, a lithium nickel manganese oxide, a lithium nickel cobalt manganese oxide, a lithium nickel cobalt aluminium oxide, and the respective modified compounds thereof. Examples of the lithium-containing phosphate can include, but are not limited to, at least one of lithium iron phosphate, a lithium iron phosphate-carbon composite, lithium manganese phosphate, a lithium manganese phosphate-carbon composite, lithium iron manganese phosphate, a lithium iron manganese phosphate-carbon composite and the respective modified compounds thereof. These positive electrode active materials may be used alone or as a combination of two or more.

In some embodiments, in order to further improve the energy density of a secondary battery, the positive electrode active material may comprise at least one selected from lithium transition metal oxides represented by formula 1 and modified compounds thereof.

$$Li_aNi_bCo_cM_dO_eA_f \qquad \text{Formula 1}$$

In the formula 1, 0.8≤a≤1.2, 0.5≤b<1, 0<c<1, 0<d<1, 1≤e≤2, 0≤f≤1, M is selected from at least one of Mn, Al, Zr, Zn, Cu, Cr, Mg, Fe, V, Ti and B, and A is selected from at least one of N, F, S and Cl.

In the present application, the modified compounds of the positive electrode active materials above may be obtained by the doping modification and/or surface coating modification of the positive electrode active material.

The positive electrode film layer typically comprises a positive electrode active material, an optional binder and an optional conductive agent. The positive electrode film layer is usually formed by applying a positive electrode slurry to a positive electrode current collector, and drying and cold-pressing same. The positive electrode slurry is usually formed by dispersing the positive electrode active material, an optional conductive agent, an optional binder, and any other components in a solvent, and uniformly stirring same. The solvent may be N-methylpyrrolidone (NMP), but is not limited thereto.

As an example, the binder for the positive electrode film layer may include at least one selected from polyvinylidene fluoride (PVDF), polytetrafluoroethylene (PTFE), a vinylidene fluoride-tetrafluoroethylene-propylene terpolymer, a vinylidene fluoride-hexafluoropropylene-tetrafluoroethylene terpolymer, a tetrafluoroethylene-hexafluoropropylene copolymer, and a fluorine-containing acrylate resin. As an example, the conductive agent for the positive electrode film layer may include at least one selected from superconducting carbon, conductive graphite, acetylene black, carbon black, Ketjen black, carbon dots, carbon nanotubes, graphene, and carbon nanofibers.

The positive electrode current collector may be a metal foil or a composite current collector. As an example of the metal foil, an aluminium foil may be used. The composite current collector may comprise a polymer material base layer and a metal material layer formed on at least one surface of the polymer material base layer. As an example, the metal material may include at least one selected from aluminium, an aluminium alloy, nickel, a nickel alloy, titanium, a titanium alloy, silver, and a silver alloy. As an example, the polymer material base layer may include at least one selected from polypropylene (PP), polyethylene terephthalate (PET), polybutylene terephthalate (PBT), polystyrene (PS), and polyethylene (PE).

[Electrolyte]

The electrolyte functions to conduct lithium ions between the positive electrode plate and the negative electrode plate. The type of the electrolyte is not specifically limited in the present application and can be selected according to requirements. For example, the electrolyte may be selected from at least one of a solid electrolyte and a liquid electrolyte (i.e., an electrolyte solution).

In some embodiments, an electrolyte solution may be used as the electrolyte and comprise an electrolyte salt and a solvent.

The type of the electrolyte salt is not specifically limited in the present application and can be selected according to requirements. In some embodiments, as an example, the electrolyte salt may include at least one selected from lithium hexafluorophosphate (LiPF$_6$), lithium tetrafluoroborate (LiBF$_4$), lithium perchlorate (LiClO$_4$), lithium hexafluoroarsenate (LiAsF$_6$), lithium bisfluorosulfonimide (LiFSI), lithium bistrifluoromethanesulfonimide (LiTFSI), lithium trifluoromethanesulfonate (LiTFS), lithium difluoro (oxalato)borate (LiDFOB), lithium bis(oxalato)borate (LiBOB), lithium difluorophosphate (LiPO$_2$F$_2$), lithium bisoxalatodifluorophosphate (LiDFOP), and lithium tetrafluorooxalatophosphate (LiTFOP).

The type of the solvent is not particularly limited in the present application and can be selected according to requirements. In some embodiments, as an example, the solvent may include at least one selected from ethylene carbonate (EC), propylene carbonate (PC), ethyl methyl carbonate (EMC), diethyl carbonate (DEC), dimethyl carbonate (DMC), dipropyl carbonate (DPC), methyl propyl carbonate (MPC), ethyl propyl carbonate (EPC), butylene carbonate (BC), fluoroethylene carbonate (FEC), methyl formate (MF), methyl acetate (MA), ethyl acetate (EA), propyl acetate (PA), methyl propionate (MP), ethyl propionate (EP), propyl propionate (PP), methyl butyrate (MB), ethyl butyrate (EB), 1,4-butyrolactone (GBL), sulfolane (SF), dimethyl sulfone (MSM), ethyl methyl sulfone (EMS), and diethyl sulfone (ESE).

In some embodiments, the electrolyte solution may also optionally comprise additives. For example, the additive may comprise a negative electrode film-forming additive, or may also comprise a positive electrode film-forming additive, or may also comprise an additive that may improve certain properties of a battery, such as an additive that improves the overcharge performance of a battery, an additive that improves the high-temperature performance of a battery, and an additive that improves the low-temperature power performance of a battery.

[Separator]

Secondary batteries using an electrolyte solution and some secondary batteries using a solid electrolyte further comprise a separator. The separator is arranged between the positive electrode plate and the negative electrode plate, and plays the role of separation. The type of the separator is not particularly limited in the present application, and any well-known porous-structure separator with good chemical stability and mechanical stability may be selected.

In some embodiments, the material of the separator may be selected from at least one of glass fibers, non-woven fabrics, polyethylene, polypropylene, and polyvinylidene fluoride. The separator may be either a single-layer film or a multi-layer composite film. When the separator is a multi-layer composite thin film, the materials of the respective layers are the same or different.

In some embodiments, the positive electrode plate, the separator, and the negative electrode plate may be formed into an electrode assembly by a winding process and/or a stacking process.

In some embodiments, the secondary battery may comprise an outer package. The outer package can be used to package the electrode assembly and electrolyte solution as described above.

In some embodiments, the outer package of the secondary battery may be a hard shell, for example, a hard plastic shell, an aluminium shell, a steel shell, etc. The outer package of the secondary battery may also be a soft bag, such as a pouch-type soft bag. The material of the soft bag may be a plastic, such as at least one of polypropylene (PP), polybutylene terephthalate (PBT), and polybutylene succinate (PBS).

The shape of the secondary battery is not particularly limited in the present application and may be cylindrical, square or of any other shape. FIG. 1 shows a secondary battery 5 with a square structure as an example.

Figure 2:
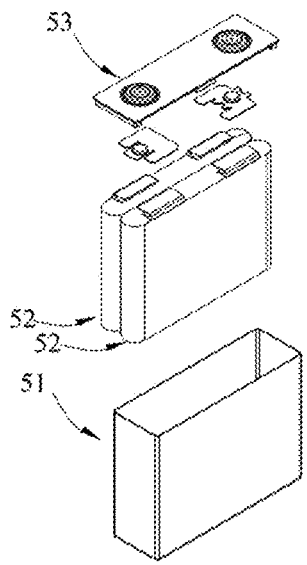
FIG. 2 shows an exploded schematic diagram of the embodiment of a secondary battery shown in FIG. 1.

In some embodiments, as shown in FIG. 2, the outer package may comprise a housing 51 and a cover plate 53. The housing 51 may comprise a bottom plate and side plates connected to the bottom plate, and the bottom plate and the side plates are enclosed to form an accommodating cavity. The housing 51 has an opening in communication with the accommodating cavity, and the cover plate 53 is used for covering the opening to close the accommodating cavity. The positive electrode plate, the negative electrode plate, and the separator may be subjected to a winding process or a laminating process to form an electrode assembly 52. The electrode assembly 52 is packaged in the accommodating cavity. The electrolyte solution infiltrates the electrode assembly 52. The number of the electrode assemblies 52 contained in the secondary battery 5 may be one or more, and may be adjusted according to requirements.

The method for preparing the secondary battery of the present application is well-known. In some embodiments, the positive electrode plate, the separator, the negative electrode plate, and the electrolyte solution may be assembled to form a secondary battery. As an example, the positive electrode plate, the separator, and the negative electrode plate may be formed into an electrode assembly by a winding process and/or a stacking process, the electrode assembly is placed in an outer package and dried, an electrolyte solution is injected, and the electrode assembly is subjected to procedures such as vacuum packaging, standing, forming, and shaping to obtain a secondary battery.

In some examples of the present application, the secondary battery according to the present application may be assembled into a battery module, the number of the secondary batteries contained in the battery module may be multiple, and the specific number may be adjusted according to the application and capacity of the battery module.

Figure 3:
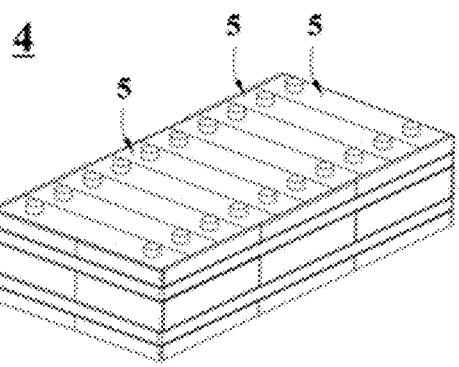
FIG. 3 shows a schematic diagram of an embodiment of a battery module of the present application.

FIG. 3 shows a schematic diagram of a battery module 4 as an example. As shown in FIG. 3, in the battery module 4, a plurality of secondary batteries 5 may be arranged in sequence along the length direction of the battery module 4. Apparently, the secondary batteries may also be arranged in any other manner. Furthermore, the plurality of secondary batteries 5 may be fixed by fasteners.

Optionally, the battery module 4 may further comprise an outer housing with an accommodating space, and the plurality of secondary batteries 5 are accommodated in the accommodating space.

In some embodiments, the above battery module may further be assembled into a battery pack, and the number of the battery modules contained in the battery pack may be adjusted according to the application and capacity of the battery pack.

Figure 4:
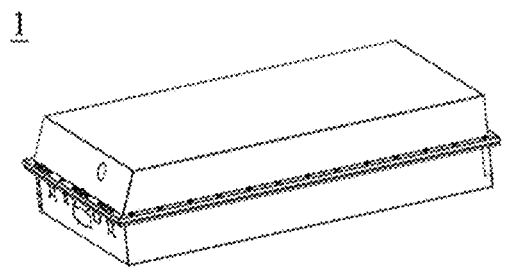
FIG. 4 shows a schematic diagram of an embodiment of a battery pack of the present application.
Figure 5:
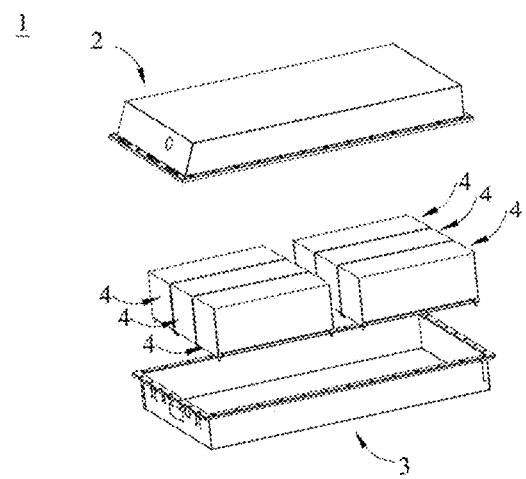
FIG. 5 shows an exploded schematic diagram of the embodiment of a battery pack shown in FIG. 4.

FIGS. 4 and 5 show a schematic diagram of a battery pack 1 as an example. As shown in FIGS. 4 and 5, the battery pack 1 may comprise a battery case and a plurality of battery modules 4 arranged in the battery case. The battery box comprises an upper box body 2 and a lower box body 3, and the upper box body 2 is used to cover the lower box body 3 to form a closed space for accommodating the battery modules 4. The plurality of the battery modules 4 may be arranged in the battery box in any manner.

Power Consuming Device

A fifth aspect of the present application provides a power consuming device. The power consuming device comprises at least one of the secondary battery, the battery module, or the battery pack of the present application. The secondary battery, the battery module or the battery pack may be used as a power supply of the power consuming device or as an energy storage unit of the power consuming device. The power consuming device may be, but is not limited to, a mobile device (e.g., a mobile phone, and a laptop computer), an electric vehicle (e.g., a pure electric vehicle, a hybrid electric vehicle, a plug-in hybrid electric vehicle, an electric bicycle, an electric scooter, an electric golf cart, and an electric truck), an electric train, a ship and a satellite, an energy storage system, etc.

A secondary battery, battery module or battery pack may be used for the power consuming device according to the usage requirements thereof.

Figure 6:
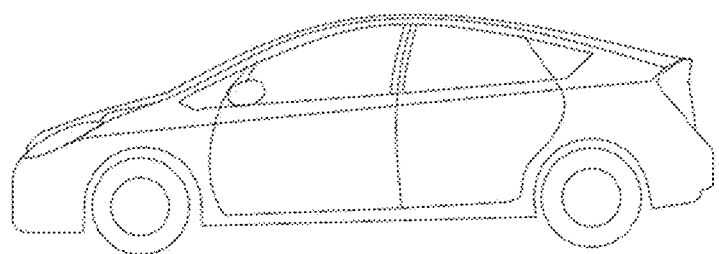
FIG. 6 shows a schematic diagram of an embodiment of a power consuming device comprising a secondary battery of the present application as a power supply.

FIG. 6 shows a schematic diagram of a power consuming device as an example. The power consuming device may be a pure electric vehicle, a hybrid electric vehicle, a plug-in hybrid electric vehicle, etc. In order to meet the requirements of the power consuming device for a high power and a high energy density, a battery pack or battery module may be used.

As another example, the power consuming device may be a mobile phone, a tablet computer, a laptop computer, etc. The power consuming device is generally required to be thin and light, and may have a secondary battery used as a power supply.

EXAMPLES

The following examples more specifically describe the content disclosed in the present application, and these examples are only used for explanatory description, because various modifications and transitions within the scope of the present disclosure are obvious to those skilled in the art. Unless otherwise stated, all the parts, percentages, and ratios reported in the following examples are on a mass basis, and all the reagents used in the examples are commercially available, obtained by synthesis through a conventional method, and used directly without further treatment, and the instruments used in the examples are commercially available.

Example 1

(1) Preparation of Prelithiated Silicon Oxide

The raw materials mixed with metal silicon and silicon dioxide were introduced into a reaction furnace, vaporized at a temperature of 650° C. under an atmosphere with a degree of vacuum of 20 Pa for 4 h to deposit on an adsorption plate and fully cooled, and then the deposit was taken out and crushed by means of a ball mill. Next, silicon oxide particles with an average particle size of 5 μm were obtained by means of classifying screening.

The prepared silicon oxide particles were mixed with a LiOH powder to form a mixed powder with a molar ratio of Li/Si of 0.7, and the mixed powder was subjected to a heat treatment under a nitrogen atmosphere at 600° C. for 6 h and then crushed in a mortar to prepare a silicon oxide containing a lithium-containing substance. The silicon oxide at this point had an average particle size of 5 m.

The prepared silicon oxide was mixed with 15% by weight (based on the mass of the silicon oxide) of a coal-based asphalt and then subjected to a heat treatment under an argon atmosphere at 700° C. for 3 h, and after the heat treatment, the resulting mixture was cooled to room temperature and screened to obtain a prelithiated silicon oxide having an average particle size of 5 m. The prelithiated silicon oxide comprises an outermost layer that is a carbon coating layer with a thickness of about 15 nm, an intermediate layer, which is a mixed layer of $Li_2SiO_3$ crystal grains and silicon and/or silicon dioxide nano crystal grains, with a thickness of about 30 nm and the mass ratio of the $Li_2SiO_3$ crystal grains to the silicon and/or silicon dioxide nano crystal grains of about 25:75, and an inner core of mixed silicon and/or silicon dioxide nano crystal grains.

(2) Preparation of Composite Negative Electrode Active Material

Under an argon atmosphere, 60 mg of the prelithiated silicon oxide prepared above (with an average particle size of 5 m) was immersed in a solution in which 30 mg of compound 1-1 was dissolved in 100 mL of N,N-dimethylformamide (DMF) and stirred for 30 min; 30 mg of compound 2-1 was then added to the solution above and stirred continuously for polymerizing and reacting same for 12 h; at the end of the reaction, the resulting precursor was washed three times via centrifugation using DMF at a rate of 8000 rpm and dried in a vacuum oven at 80° C. for 12 h to obtain a prepolymer; and the resulting prepolymer was transferred to a tube furnace and programmatically heated to 100° C., 150° C., 200° C., 250° C. and 300° C. respectively and held at the temperature for 1 h respectively under an argon atmosphere with a temperature increase rate of 3° C./min, and the composite negative electrode active material was obtained at the end of the reaction.

(3) Preparation of Negative Electrode Plate

The composite negative electrode active material prepared above, artificial graphite, a conductive agent of carbon black, a binder of a styrene-butadiene rubber (SBR), and a dispersant of sodium carboxymethyl cellulose (CMC) were mixed at a mass ratio of 12:85:1:1:1, deionized water was added as a solvent, followed by stirring until uniform to obtain a negative electrode slurry. A negative electrode current collector of a copper foil having a thickness of 7 μm was evenly coated with the resulting negative electrode slurry with a surface density of 9.7 mg/cm², followed by drying, cold pressing and slitting to obtain a negative electrode plate.

(4) Preparation of Positive Electrode Plate

A positive electrode active material of $LiNi_{0.5}Co_{0.2}Mn_{0.3}O_2$ (NCM523), a binder of polyvinylidene fluoride (PVDF) and a conductive agent of acetylene black were mixed at a mass ratio of 98:1:1, N-methylpyrrolidone (NMP) was added as a solvent, followed by stirring under vacuum until uniform to obtain a positive electrode slurry. A positive electrode current collector of an aluminum foil having a thickness of 13 μm was evenly coated with the resulting positive electrode slurry with a surface density of 13.7 mg/cm², followed by drying at 140° C., cold pressing and slitting to obtain a positive electrode plate.

(5) Preparation of Electrolyte Solution

In an argon atmosphere glove box (the content of both water and oxygen was 0.1 ppm or less), ethylene carbonate (EC) and ethyl methyl carbonate (EMC) were mixed uniformly at a volume ratio of 3:7 as an organic solvent, and 12.5% (based on the total mass of the organic solvent) of $LiPF_6$ was then added and dissolved into the above organic solvent and stirred until uniform to obtain an electrolyte solution.

(6) Separator

A commercially available microporous PP-PE copolymer thin film with a thickness of 20 μm and an average pore size of 80 nm (from Zhuogao Electronic Technology Co., Ltd., model 20) was used.

(7) Preparation of Secondary Battery

The positive electrode plate, the separator, and the negative electrode plate were stacked in sequence and wound to obtain an electrode assembly; the electrode assembly was placed in an outer package, and the above electrolyte solution was injected, followed by procedures such as packaging, standing, forming and aging, to obtain a secondary battery.

Examples 2-15 and Comparative Examples 3-5

The method for preparing a secondary battery was similar to that of example 1, except that the preparation parameters of the composite negative electrode active material were different, see Table 1 for details.

In Table 1, the molecular formula of each compound was as follows.

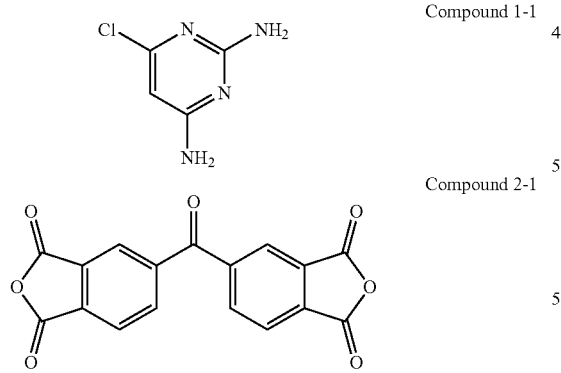

Compound 1-1

Compound 2-1

Compound 1-2

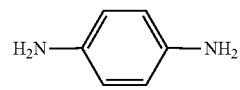

-continued

Compound 1-3
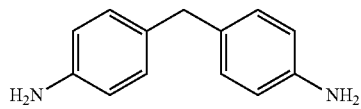

Compound 1-4
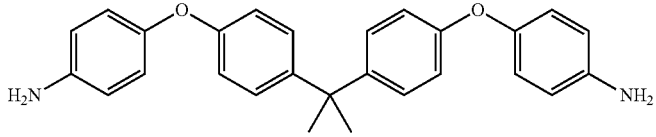

Compound 2-2
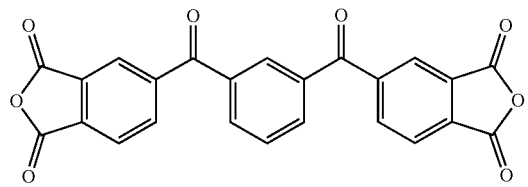

Compound 2-3
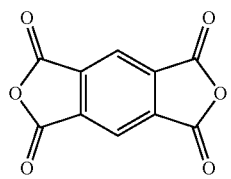

Compound 2-4
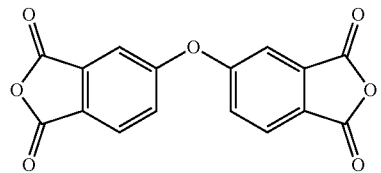

Compound 2-5
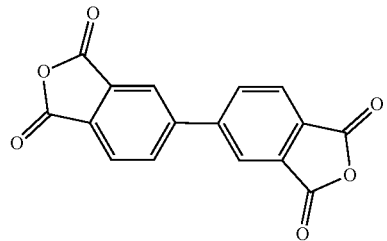

Comparative Example 1

The method for preparing a secondary battery was similar to that of example 1, except that a prelithiated silicon oxide was directly used to replace the composite negative electrode active material prepared in example 1 during the preparation of the negative electrode plate.

Comparative Example 2

The method for preparing a secondary battery was similar to that of example 1, except that a polythiophene-coated prelithiated silicon oxide was used to replace the composite negative electrode active material prepared in example 1 during the preparation of the negative electrode plate.

TABLE 1

| No. | Prelithiated silicon oxide | | Diamine monomer | | Dianhydride monomer | | Polymer-ization reaction time |
|---|---|---|---|---|---|---|---|
| | Average particle size (μm) | Addition mass (mg) | Type | Addition mass (mg) | Type | Addition mass (mg) | |
| Example 1 | 5 | 60 | Compound 1-1 | 30 | Compound 2-1 | 30 | 12 h |
| Example 2 | 5 | 60 | Compound 1-1 | 35 | Compound 2-1 | 35 | 12 h |

TABLE 1-continued

| No. | Prelithiated silicon oxide Average particle size (μm) | Prelithiated silicon oxide Addition mass (mg) | Diamine monomer Type | Diamine monomer Addition mass (mg) | Dianhydride monomer Type | Dianhydride monomer Addition mass (mg) | Polymerization reaction time |
|---|---|---|---|---|---|---|---|
| Example 3 | 5 | 60 | Compound 1-1 | 40 | Compound 2-1 | 40 | 12 h |
| Example 4 | 5 | 60 | Compound 1-1 | 45 | Compound 2-1 | 45 | 12 h |
| Example 5 | 5 | 60 | Compound 1-1 | 48 | Compound 2-1 | 48 | 12 h |
| Example 6 | 5 | 60 | Compound 1-1 | 10 | Compound 2-1 | 10 | 12 h |
| Example 7 | 5 | 60 | Compound 1-1 | 20 | Compound 2-1 | 20 | 12 h |
| Example 8 | 7 | 60 | Compound 1-1 | 30 | Compound 2-1 | 30 | 12 h |
| Example 9 | 10 | 60 | Compound 1-1 | 30 | Compound 2-1 | 30 | 12 h |
| Example 10 | 5 | 60 | Compound 1-1 | 30 | Compound 2-1 | 30 | 24 h |
| Example 11 | 5 | 60 | Compound 1-1 | 30 | Compound 2-1 | 30 | 16 h |
| Example 12 | 5 | 60 | Compound 1-1 | 30 | Compound 2-2 | 30 | 12 h |
| Example 13 | 5 | 60 | Compound 1-2 | 22.5 | Compound 2-1 | 30 | 12 h |
| Example 14 | 5 | 60 | Compound 1-3 | 41 | Compound 2-1 | 30 | 12 h |
| Example 15 | 5 | 60 | Compound 1-4 | 85 | Compound 2-1 | 30 | 12 h |
| Comparative example 1 | 5 | / | / | / | / | / | / |
| Comparative example 2 | 5 | / | / | / | / | / | / |
| Comparative example 3 | 5 | 60 | Compound 1-1 | 30 | Compound 2-3 | 20 | 12 h |
| Comparative example 4 | 5 | 60 | Compound 1-1 | 30 | Compound 2-4 | 28.5 | 12 h |
| Comparative example 5 | 5 | 60 | Compound 1-1 | 30 | Compound 2-5 | 27 | 12 h |

Test Part
(1) Determination of Weight-Average Molecular Weight of Conductive Polymer The composite negative electrode active material prepared above was immersed into N,N-dimethylformamide (DMF), such that the conductive polymer was dissolved in DMF, then the solution was collected by means of a syringe, and the weight-average molecular weight of the conductive polymer was determined by means of gel permeation chromatography using the HLC-8320 GPC semi-micro gel permeation chromatograph from Tosoh.

(2) Determination of Glass Transition Temperature Tg of Conductive Polymer

The composite negative electrode active material prepared above was immersed into N,N-dimethylformamide (DMF), such that the conductive polymer was dissolved in DMF, and heated to volatilize DMF to obtain a conductive polymer test sample.

The Tg of the conductive polymer was determined using a DSC-3 model differential scanning calorimeter from Mettler-Toledo. The determination was carried out according to the following steps: about 10 mg of the test sample was weighed, charged into a flat bottom $Al_2O_3$ crucible, shaken for leveling, covered with a lid and heated from 35° C. to 600° C. at a rate of 10° C./min, during which argon was used as a protective gas, the flow rate of a purging gas was 50 mL/min, and the flow rate of the protective gas was 20 mL/min.

(3) Determination of Thickness of Conductive Polymer Layer

A TEM image of the negative electrode plate was obtained by using the ThermoFisher Talos transmission electron microscope, then the thicknesses at 30 different positions in the TEM image were measured, and the average of the thicknesses was taken as the thickness of the conductive polymer layer.

(4) Cyclic Voltammetry Test of Composite Negative Electrode Active Material

A metal lithium plate as a counter electrode, an electrolyte solution with 1 mol/L of lithium hexafluorophosphate ($LiPF_6$) as a solute and a mixed solution of ethylene carbonate (EC) and dimethyl carbonate (DMC) at a volume ratio of 1:1 as a solvent, and a glass fiber as a separator were assembled together with the negative electrode plate prepared above to form a CR2032 button cell in a glove box filled with argon (the content of both water and oxygen was 0.1 ppm or less), and the packaged button cell was allowed to stand in the glove box for 12 hours or more for aging same.

The resulting button cell was subjected to a cyclic voltammetry test using a CHI 660 electrochemical workstation from Shanghai Chenhua Instrument Co., Ltd., to obtain the cyclic voltammetry curve of the composite negative electrode active material. In order to better observe the peak position, the scanning voltage for examples 1-15 and comparative examples 3-5 was 2.0 V-4.3 V, the scanning voltage for comparative example 1 was 0 V-2.0 V, and the scanning voltage for comparative example 2 was 0 V-4.0 V, and the scanning rate was 0.1 mV/s. Meanwhile, the oxidation peak potential and reduction peak potential given in Table 2 did not take into account the peak position of artificial graphite.

(5) Determination of Initial Capacity Per Gram and Initial Coulombic Efficiency of Button Cell At 25° C., the CR2032 button cell prepared above was first discharged at a constant current to 0 V at a current density of 10 mA/g, and the first-cycle discharging capacity of the button cell was recorded; and then the button cell was charged at a constant current to 2.5 V at a current density of 10 mA/g, and the first-cycle charging capacity of the button cell was recorded. The initial capacity per gram (mAh/g) of button cell=first-cycle charging capacity of button cell/(mass of composite negative electrode active material+mass of artificial graphite). Initial coulombic efficiency (%) of button cell N first-cycle charging capacity of button cell/first-cycle discharging capacity of button cell×100%.

(6) Test for Cycling Performance of Secondary Battery

At 25° C., the secondary battery prepared above was charged at a rate of 2 C and discharged at a rate of 1 C and subjected to a continuous cycle test in an interval from 3% SOC to 97% SOC until the capacity of the secondary battery was less than 80% of the first-cycle discharging capacity, and the number of cycles was recorded. In the present application, the capacity retention performance of a secondary battery is evaluated through the number of cycles after fast charging at a rate 2 C at 25° C., and a higher number of cycles of a secondary battery indicates a better capacity retention performance of the secondary battery.

TABLE 2

| No. | Conductive polymer | | | | cyclic voltammetry curve | | Initial capacity per gram (mAh/g) | Initial coulombic efficiency | Number of cycles |
| | Molar ratio of ketone carbonyl to imide ring | Weight average molecular weight | Tg (° C.) | Thickness of conductive polymer layer (nm) | Oxidation peak potential (V) | Reduction peak potential (V) | | | |
| --- | --- | --- | --- | --- | --- | --- | --- | --- | --- |
| Example 1 | 0.5 | 30,000-35,000 | 240 | 0.5 | 3.30 | 2.20 | 458 | 92% | 730 |
| Example 2 | 0.5 | 30,000-35,000 | 240 | 1 | 3.35 | 2.30 | 456.5 | 91% | 710 |
| Example 3 | 0.5 | 30,000-35,000 | 240 | 3 | 3.40 | 2.40 | 450 | 89% | 690 |
| Example 4 | 0.5 | 30,000-35,000 | 240 | 5 | 3.45 | 2.50 | 434 | 85% | 650 |
| Example 5 | 0.5 | 30,000-35,000 | 240 | 10 | 3.50 | 2.60 | 425 | 80% | 600 |
| Example 6 | 0.5 | 30,000-35,000 | 240 | 0.1 | 3.20 | 2.10 | 457 | 90% | 500 |
| Example 7 | 0.5 | 30,000-35,000 | 240 | 0.2 | 3.25 | 2.15 | 458 | 91% | 530 |
| Example 8 | 0.5 | 30,000-35,000 | 240 | 0.3 | 3.26 | 2.16 | 452 | 89% | 540 |
| Example 9 | 0.5 | 30,000-35,000 | 240 | 0.2 | 3.25 | 2.15 | 450 | 88% | 520 |
| Example 10 | 0.5 | 95,000-100,000 | 240 | 0.5 | 3.30 | 2.20 | 442 | 85% | 660 |
| Example 11 | 0.5 | 50,000-55,000 | 240 | 0.5 | 3.30 | 2.20 | 445 | 86% | 680 |
| Example 12 | 1 | 30,000-35,000 | 260 | 0.5 | 3.40 | 2.40 | 456 | 90% | 700 |
| Example 13 | 0.5 | 30,000-35,000 | 250 | 0.5 | 3.40 | 2.40 | 458 | 91% | 700 |
| Example 14 | 0.5 | 30,000-35,000 | 260 | 0.5 | 3.45 | 2.42 | 457 | 90% | 670 |
| Example 15 | 0.5 | 30,000-35,000 | 260 | 0.5 | 3.55 | 2.45 | 456 | 90% | 660 |
| Comparative example 1 | / | / | / | / | 0.80 | 0.50 | 440 | 80% | 300 |
| Comparative example 2 | / | / | / | 0.5 | 4.00 | 1.70/3.70 | 447 | 88% | 430 |
| Comparative example 3 | 0 | 30,000-35,000 | 260 | 0.5 | 2.80 | 1.80 | 446 | 87% | 410 |
| Comparative example 4 | 0 | 30,000-35,000 | 260 | 0.5 | 2.80 | 1.90 | 445 | 86% | 400 |
| Comparative example 5 | 0 | 30,000-35,000 | 260 | 0.5 | 2.80 | 1.95 | 443 | 86% | 410 |

As can be seen from the test results of examples 1-15 and comparative examples 1-5 in combination, providing a conductive polymer layer on the surface of a prelithiated silicon oxide and making the cyclic voltammetry curve of the composite negative electrode active material show an oxidation peak within a range of 3.2 V-3.6 V and a reduction peak within a range of 2.1 V-2.6 V can enable the resulting composite negative electrode active material to combine a high capacity per gram and a high initial coulombic efficiency, thus making the secondary battery have a long cycle life.

Figure 7:
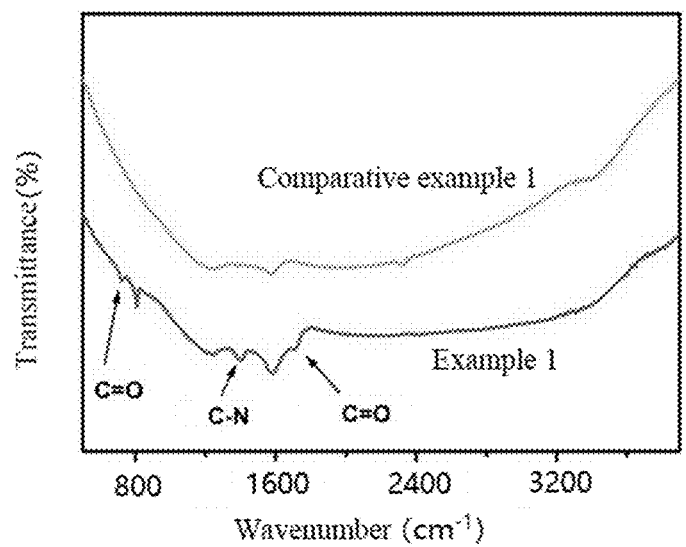
FIG. 7 shows the infrared spectrograms of the composite negative electrode active materials prepared in example 1 and comparative example 1.

FIG. 7 shows the infrared spectrograms of the composite negative electrode active materials prepared in example 1 and comparative example 1, which are obtained by using a test instrument of ThermoFisher Nicolet iS10 fourier transform infrared spectrometer according to the GB/T 6040-2019 test standard. As can be seen from FIG. 7, the composite negative electrode active material prepared in example 1 has a C—N stretching vibration peak at 1396±41 cm$^{-1}$ and a C═O stretching vibration peak at 1782±53 cm$^{-1}$, which demonstrates that a conductive polymer is successfully coated onto the surface of a prelithiated silicon oxide by the in-situ polymerization method provided in the present application.

Figure 8:
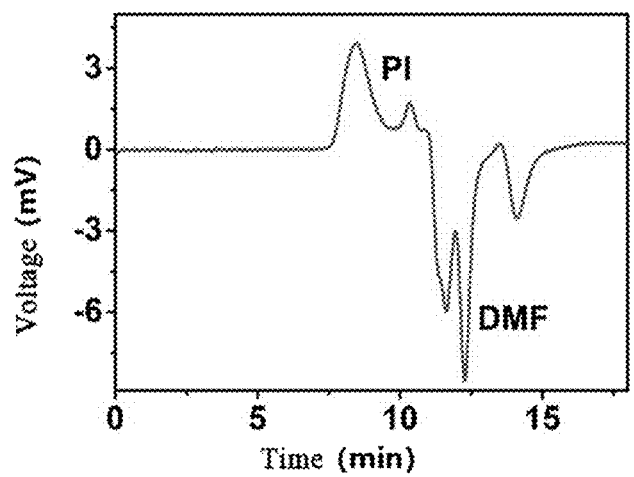
FIG. 8 shows a gel permeation chromatography (GPC) diagram of a conductive polymer layer in a composite negative electrode active material prepared in example 1.
Figure 9:
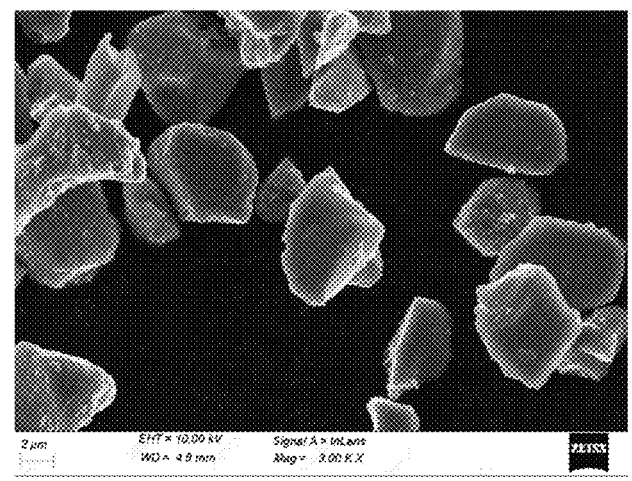
FIG. 9 shows a scanning electron microscope (SEM) image of a composite negative electrode active material prepared in example 1.
Figure 10:
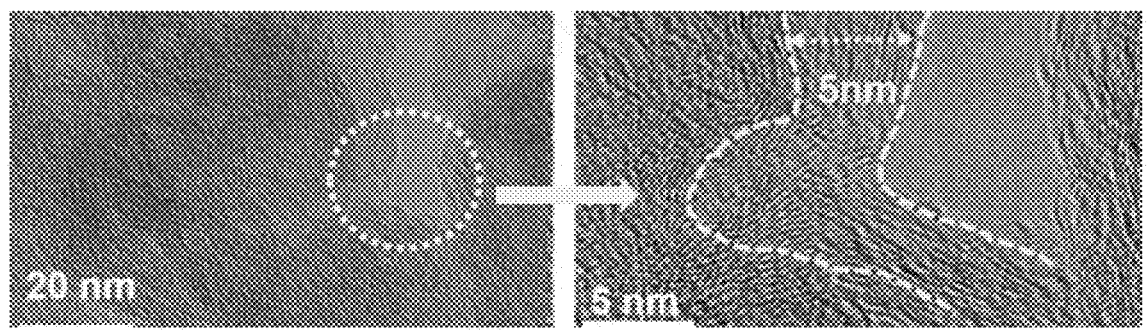
FIG. 10 shows a transmission electron microscope (TEM) image of a composite negative electrode active material prepared in example 4.
Figure 11:
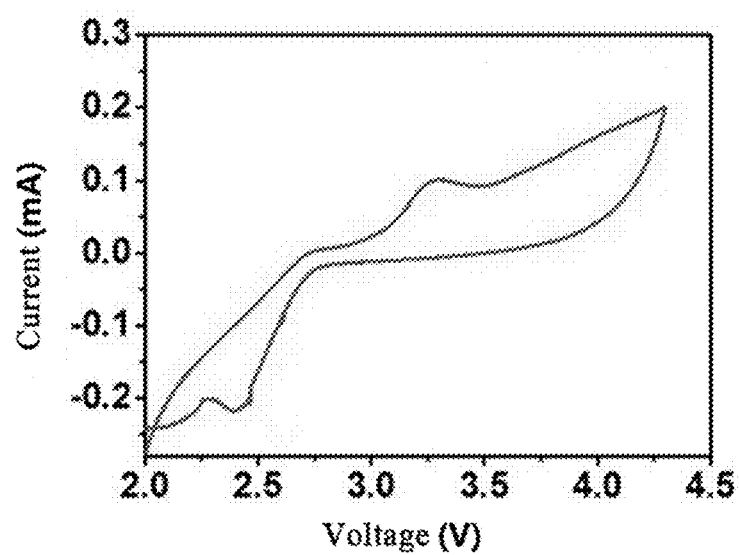
FIG. 11 shows a cyclic voltammetry curve of a negative electrode active material prepared in example 3.

FIG. 8 shows a gel permeation chromatography (GPC) diagram of a conductive polymer layer in a composite negative electrode active material prepared in example 1. FIG. 9 shows a scanning electron microscope (SEM) image of a composite negative electrode active material prepared in example 1. FIG. 10 shows a transmission electron microscope (TEM) image of a composite negative electrode active material prepared in example 4. FIG. 11 shows a cyclic voltammetry curve of a negative electrode active material prepared in example 3.

As can be seen from FIG. 11, the cyclic voltammetry curve of the composite negative electrode active material provided by the present application has an oxidation peak within a range of 3.2 V-3.6 V and a reduction peak within a range of 2.1 V-2.6 V. However, there is no oxidation peak and reduction peak within the scanning voltage range of 2.0 V-4.3 V for the prelithiated silicon oxide that is not coated with a conductive polymer layer in comparative example 1.

Conventional polythiophene or polyimide without a ketone carbonyl in the main chain structure thereof was used as a conductive polymer in the conductive polymer layer in the composite negative electrode active material prepared in comparative examples 2-5, which can increase the initial coulombic efficiency of a button cell and the number of cycles of a secondary battery to a certain extent, but the improvement effect is limited. The possible reasons are that the prelithiated silicon oxide has severe volume expansion, such that the prelithiated silicon oxide cannot be continuously protected when conventional polythiophene or polyimide without a ketone carbonyl in the main chain structure thereof was used as a conductive polymer; in addition, using conventional polythiophene or polyimide without a ketone carbonyl in the main chain structure thereof as a conductive polymer has a limited effect on increasing the oxidation peak potential and the reduction peak potential of the cyclic voltammetry curve of the composite negative electrode active material, such that the conductive polymer layer relatively poorly shares the lithium storage current and lithium intercalation pressure and cannot effectively reduce the damage of the current to the prelithiated silicon oxide particles; and moreover, the conductive polymer layer also has a relatively poor effect on decreasing the concentration polarization on the negative electrode side. Therefore, it is difficult for a secondary battery to have a long cycle life when conventional polythiophene or polyimide without a ketone carbonyl in the main chain structure thereof was used as a conductive polymer.

Figure 12:
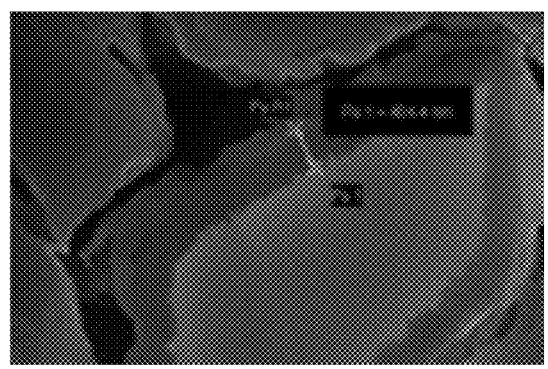
FIG. 12 shows a scanning electron microscope (SEM) image of a cross-section of a composite negative electrode active material after the capacity of the secondary battery prepared in example 1 decays to 80% of the first-cycle discharging capacity.
Figure 13:
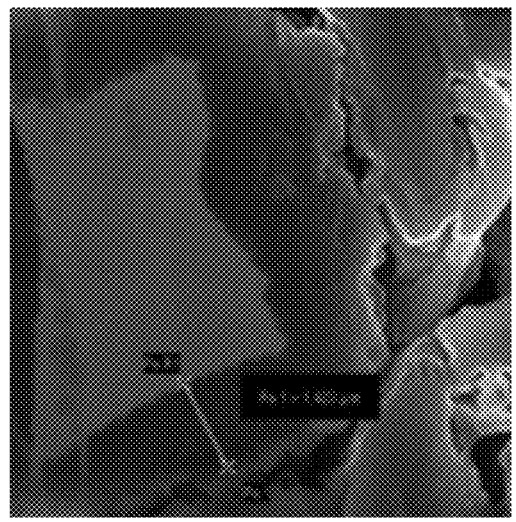
FIG. 13 shows a scanning electron microscope (SEM) image of a cross-section of a composite negative electrode active material after the capacity of the secondary battery prepared in comparative example 1 decays to 80% of the first-cycle discharging capacity. In the drawings, the figures are not necessarily drawn to scale. List of reference signs: 1. battery pack, 2. upper case body, 3. lower case body, 4. battery module, 5. secondary battery, 51. housing, 52. electrode assembly, and 53. cover plate.

FIG. 12 shows a scanning electron microscope (SEM) image of a cross-section of a composite negative electrode active material after the capacity of the secondary battery prepared in example 1 decays to 80% of the first-cycle discharging capacity. FIG. 13 shows a scanning electron microscope (SEM) image of a cross-section of a composite negative electrode active material after the capacity of the secondary battery prepared in comparative example 1 decays to 80% of the first-cycle discharging capacity. As can be seen from FIGS. 12 and 13, after cycling, the side reaction product layer for the composite negative electrode active material prepared in example 1 has a thickness of about 484 nm, while, after cycling, the side reaction product layer for the prelithiated silicon oxide that is not coated with a conductive polymer layer used in comparative example 1 has a thickness of about 1423 nm. Therefore, the conductive polymer layer in the composite negative electrode active material provided by the present application can continuously protect the negative electrode active material substrate, which effectively avoids the continuous consumption of active lithium ions and the continuous growth and thickening of the SEI film and the side reaction product layer, thus enabling a secondary battery using same to combine a high energy density and a long cycle life.

It should be noted that the present application is not limited to the above embodiments. The above embodiments are exemplary only, and any embodiment that has substantially the same constitutions as the technical ideas and has the same effects within the scope of the technical solution of the present application is encompassed within the technical scope of the present application. In addition, without departing from the scope of the subject matter of the present application, various modifications that are made to the embodiments and are conceivable to those skilled in the art, and other modes constructed by combining some of the constituent elements of the embodiments are also encompassed within the scope of the present application.

What is claimed is:

1. A composite negative electrode active material comprising a negative electrode active material substrate and a conductive polymer layer on the surface of the negative electrode active material substrate, wherein the cyclic voltammetry curve of the composite negative electrode active material has an oxidation peak within a range of 3.2 V-3.6 V and a reduction peak within a range of 2.1 V-2.6 V, and the cyclic voltammetry curve of the composite negative electrode active material is obtained according to the following test method comprising: (1) providing a negative electrode plate comprising the composite negative electrode active material; (2) using a metal lithium plate as a counter electrode, an electrolyte solution with 1 mol/L of lithium hexafluorophosphate as a solute and a mixed solution of ethylene carbonate and dimethyl carbonate at a volume ratio of 1:1 as a solvent, and a glass fiber as a separator, and assembling same with the negative electrode plate to form a button cell in a glove box filled with argon, and leaving the packaged button cell to stand in the glove box for 12 hours or more for aging same; and (3) subjecting the resulting button cell to a cyclic voltammetry test by means of an electrochemical workstation to obtain the cyclic voltammetry curve of the composite negative electrode active material, wherein a scanning voltage is 2.0 V-4.3 V and a scanning rate is 0.1 mV/s, wherein the conductive polymer layer comprises a conductive polymer, the conductive polymer includes polyimide, wherein the monomer unit of the polyimide is represented by formula 1, Formula 1

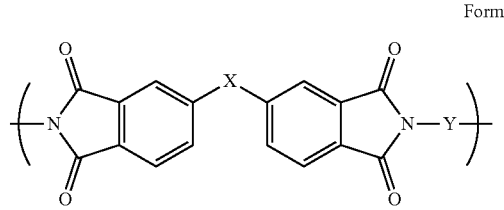

wherein X represents at least one of the group consisting of the following groups having a ketone carbonyl C=O in the main chain structure thereof: an alkyl group, an alicyclic group, an aliphatic heterocyclic group, an aromatic group, and a heteroaromatic group; and Y represents one of the following groups:

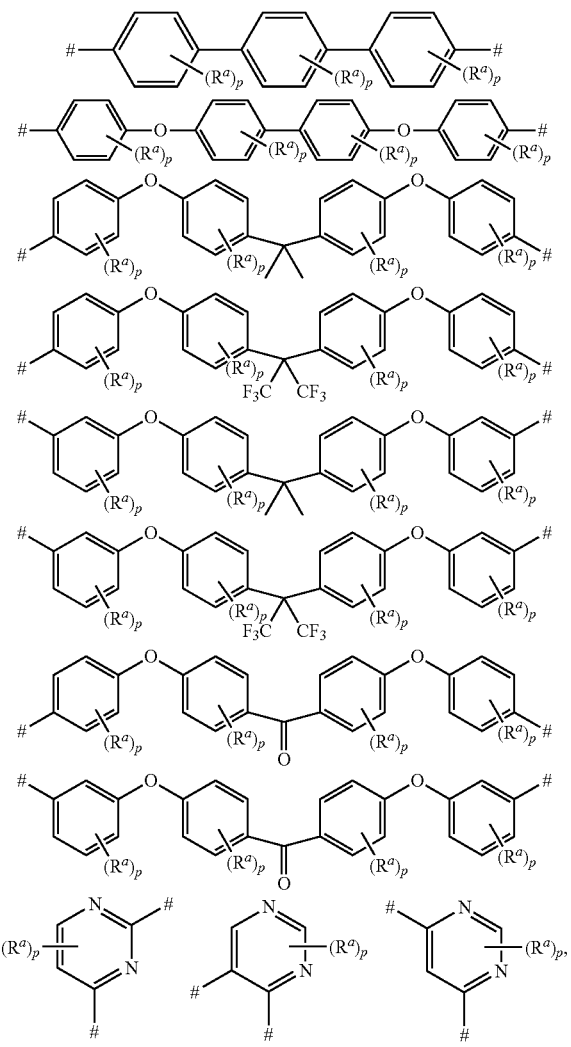

wherein #represents the linking position, p at each occurrence independently represents 0, 1, 2, 3 or 4, and $R^a$ at each occurrence independently represents at least one of a halogen atom, C1-C6 alkyl, C1-C6 alkoxy, and C1-C6 haloalkyl.

2. The composite negative electrode active material according to claim 1, wherein
the cyclic voltammetry curve of the composite negative electrode active material has an oxidation peak within a range of 3.3 V-3.55 V; and/or
the cyclic voltammetry curve of the composite negative electrode active material has a reduction peak within a range of 2.2 V-2.45 V.

3. The composite negative electrode active material according to claim 1, wherein
the potential of the oxidation peak on the cyclic voltammetry curve of the composite negative electrode active material is higher than the potential of the oxidation peak on the cyclic voltammetry curve of the negative electrode active material substrate, and optionally, the difference between the potential of the oxidation peak on the cyclic voltammetry curve of the composite negative electrode active material and the potential of the oxidation peak on the cyclic voltammetry curve of the negative electrode active material substrate is 2.4 V-2.8 V, more optionally 2.5 V-2.75 V; and/or
the potential of the reduction peak on the cyclic voltammetry curve of the composite negative electrode active material is higher than the potential of the reduction peak on the cyclic voltammetry curve of the negative electrode active material substrate, and optionally, the difference between the potential of the reduction peak on the cyclic voltammetry curve of the composite negative electrode active material and the potential of the reduction peak on the cyclic voltammetry curve of the negative electrode active material substrate is 1.5 V-2.1 V, more optionally 1.7 V-1.95 V.

4. The composite negative electrode active material according to claim 1, wherein the infrared spectrogram of the composite negative electrode active material has a first absorption peak at a wavenumber of $1396\pm41$ cm$^{-1}$ and a second absorption peak at a wavenumber of $1782\pm53$ cm$^{-1}$, and optionally the height ratio of the first absorption peak to the second absorption peak is $1.75\pm0.1$.

5. The composite negative electrode active material according to claim 1, wherein the polyimide has a ketone carbonyl in the main chain structure thereof, and the molar ratio of the ketone carbonyl C=O to the imide ring C(=O)—N—C(=O) is 0.5 to 2, and
optionally, the polyimide is obtained by polymerizing a dianhydride monomer having a ketone carbonyl C=O in the main chain structure thereof with a diamine monomer.

6. The composite negative electrode active material according to claim 5, wherein X represents any one of the following groups:

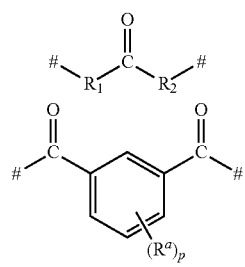

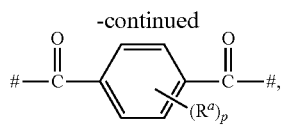

wherein $R_1$ and $R_2$ each independently represent a C0-C12 divalent alkyl group, C3-C12 divalent alicyclic group, C1-C12 divalent aliphatic heterocyclic group, C6-C30 divalent aromatic group or C2-C30 divalent heteroaromatic group, which is unsubstituted or substituted with $R^a$, p represents 0, 1, 2, 3 or 4, $R^a$ at each occurrence independently represents at least one of a halogen atom, C1-C6 alkyl, C1-C6 alkoxy, and C1-C6 haloalkyl, and #represents the linking position.

7. The composite negative electrode active material according to claim 5, wherein
   the conductive polymer has a weight-average molecular weight of 30,000-100,000; and/or
   the conductive polymer has a glass transition temperature of 220° C.-260° C.

8. The composite negative electrode active material according to claim 1, wherein
   the conductive polymer layer has a thickness of 50 nm or less; and/or
   the composite negative electrode active material has an average particle size of 3 μm-15 μm.

9. The composite negative electrode active material according to claim 1, wherein the negative electrode active material substrate includes at least one selected from the following materials which are prelithiated or non-prelithiated: a carbon-based material, a silicon-based material, and a tin-based material,
   wherein the carbon-based material includes at least one selected from graphite, soft carbon and hard carbon;
   wherein the silicon-based material includes at least one selected from elemental silicon, a silicon oxide, and a silicon alloy; and
   wherein the tin-based material includes at least one selected from elemental tin, a tin oxide, and a tin alloy.

10. The composite negative electrode active material according to claim 9, wherein the negative electrode active material substrate is a prelithiated silicon oxide, and optionally, the prelithiated silicon oxide comprises:
    a silicon oxide substrate inner core;
    a lithium silicate intermediate layer on the surface of the silicon oxide substrate inner core, comprising lithium silicate crystal grains and silicon and/or silicon dioxide nano crystal grains; and
    a carbon coating layer on the surface of the lithium silicate intermediate layer; and
    optionally, the lithium silicate crystal grains include $Li_2SiO_3$ crystal grains.

11. The composite negative electrode active material according to claim 10, wherein
    the mass ratio of the lithium silicate crystal grains to the silicon and/or silicon dioxide nano crystal grains in the lithium silicate intermediate layer is (10-50):(50-90); and/or
    the lithium silicate intermediate layer has a thickness of 15 nm-35 nm; and/or
    the carbon coating layer has a thickness of 15 nm-25 nm.

12. A method for preparing a composite negative electrode active material according to claim 1, comprising the steps of:

S1: providing a negative electrode active material substrate, a dianhydride monomer having a ketone carbonyl C=O in the main chain structure thereof, a diamine monomer and a solvent, optionally the diamine monomer including at least one selected from a chain aliphatic diamine monomer, an alicyclic diamine monomer, and an aromatic diamine monomer;

S2: dissolving the diamine monomer into the solvent to obtain a solution in which the diamine monomer is dissolved;

S3: under a protective gas atmosphere, adding the negative electrode active material substrate to the solution in which the diamine monomer is dissolved and stirring and mixing same until uniform, and then adding the dianhydride monomer having a ketone carbonyl C=O in the main chain structure thereof and stirring and mixing same until uniform, subjecting same to a polymerization reaction, followed by washing and drying to obtain a prepolymer; and S4: under a protective gas atmosphere, subjecting the prepolymer obtained in S3 to an imidization reaction, and obtaining the composite negative electrode active material at the end of the reaction;

wherein the composite negative electrode active material comprises a negative electrode active material substrate and a conductive polymer layer on the surface of the negative electrode active material substrate, and the cyclic voltammetry curve of the composite negative electrode active material has an oxidation peak within a range of 3.2 V-3.6 V and a reduction peak within a range of 2.1 V-2.6 V, wherein the conductive polymer layer comprises a conductive polymer, the conductive polymer includes polyimide, wherein the monomer unit of the polyimide is represented by formula 1, Formula 1

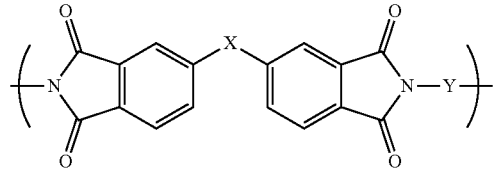

wherein X represents at least one of the group consisting of the following groups having a ketone carbonyl C=O in the main chain structure thereof: an alkyl group, an alicyclic group, an aliphatic heterocyclic group, an aromatic group, and a heteroaromatic group; and Y represents one of the following groups:

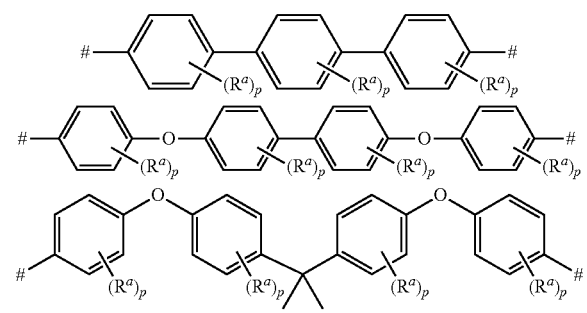

-continued

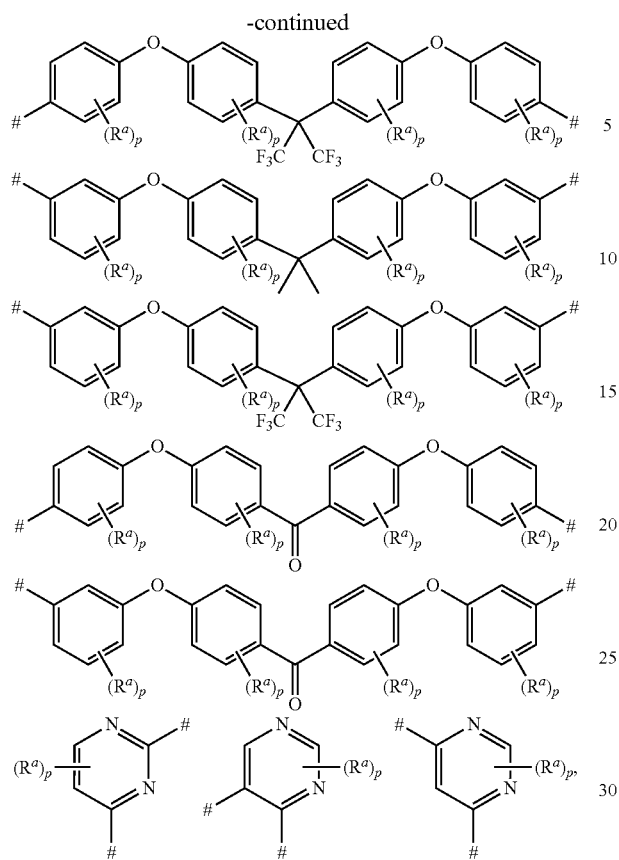

wherein #represents the linking position, p at each occurrence independently represents 0, 1, 2, 3 or 4, and $R^a$ at each occurrence independently represents at least one of a halogen atom, C1-C6 alkyl, C1-C6 alkoxy, and C1-C6 haloalkyl.

13. The method according to claim 12, wherein a staged thermal insulation process is used in the imidization reaction in S4, and optionally the staged thermal insulation process comprises: a first stage of warming up to 100±15° C. at a rate of 3° C./min-5° C./min and holding at the temperature for 1 h-1.5 h; a second stage of warming up to 150±15° C. at a rate of 3° C./min-5° C./min and holding at the temperature for 1 h-1.5 h; a third stage of warming up to 200±15° C. at a rate of 3° C./min-5° C./min and holding at the temperature for 1 h-1.5 h; a fourth stage of warming up to 250±15° C. at a rate of 3° C./min-5° C./min and holding at the temperature for 1 h-1.5 h; and a fifth stage of warming up to 300±15° C. at a rate of 3° C./min-5° C./min and holding at the temperature for 1 h-1.5 h.

14. The method according to claim 12, wherein
the molar ratio of the diamine monomer to the dianhydride monomer having a ketone carbonyl C═O in the main chain structure thereof is ≥2:1; and/or
the solvent is an aprotic polar solvent including at least one selected from N,N-dimethylformamide, N,N-dimethylacetamide, and N-methylpyrrolidone.

15. The method according to claim 12, wherein the dianhydride monomer having a ketone carbonyl C═O in the main chain structure thereof includes at least one selected from the following compounds:

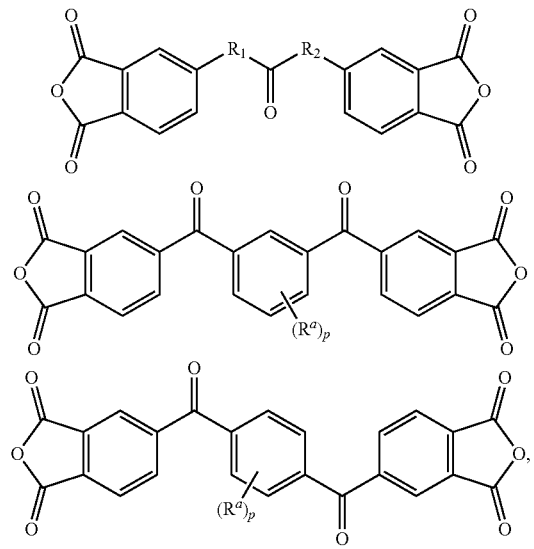

wherein $R_1$ and $R_2$ each independently represent a C0-C12 divalent alkyl group, C3-C12 divalent alicyclic group, C1-C12 divalent aliphatic heterocyclic group, C6-C30 divalent aromatic group or C2-C30 divalent heteroaromatic group, which is unsubstituted or substituted with $R^a$, p represents 0, 1, 2, 3 or 4, and $R^a$ at each occurrence independently represents at least one of a halogen atom, C1-C6 alkyl, C1-C6 alkoxy, and C1-C6 haloalkyl.

16. The method according to claim 12, wherein the negative electrode active material substrate includes at least one selected from the following materials which are pre-lithiated or non-prelithiated: a carbon-based material, a silicon-based material, and a tin-based material.

17. A negative electrode plate comprising a negative electrode current collector and a negative electrode film layer on the surface of the negative electrode current collector, wherein the negative electrode film layer comprises a composite negative electrode active material according to claim 1, and the mass percentage content of the composite negative electrode active material in the negative electrode film layer is 1% to 99%, optionally 5% to 30%, based on the total mass of the negative electrode film layer.

18. A secondary battery comprising a negative electrode plate according to claim 17.

19. A power consuming device comprising a secondary battery according to claim 18.

20. The method according to claim 15, wherein the dianhydride monomer having a ketone carbonyl C═O in the main chain structure thereof includes at least one selected from the following compounds:

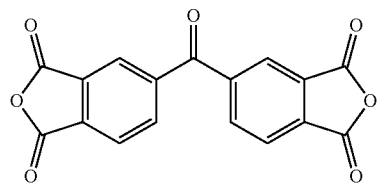

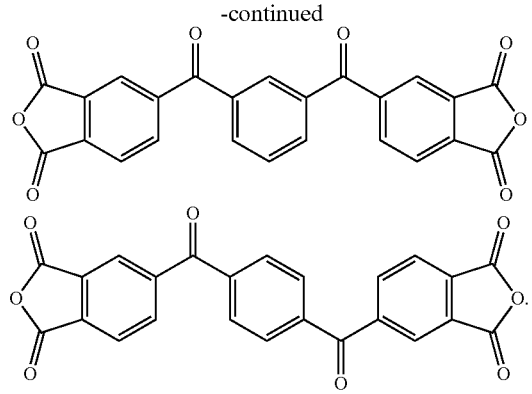
21. The composite negative electrode active material according to claim 1, wherein Y represents one of the following groups:
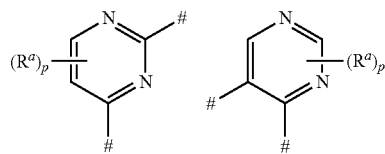
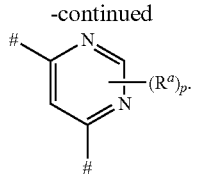
22. The method according to claim 12, wherein the diamine monomer includes at least one selected from the following compounds:
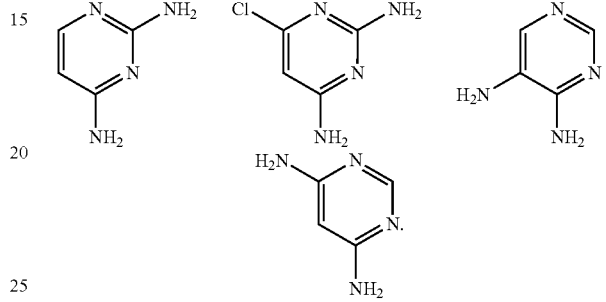
* * * * *